United States Patent
Kobayashi et al.

(10) Patent No.: US 8,803,491 B2
(45) Date of Patent: Aug. 12, 2014

(54) DC/DC VOLTAGE CONVERTER AND VOLTAGE CONVERSION CONTROL METHOD THEREFOR

(71) Applicant: Mitsubishi Electric Corporation, Tokyo (JP)

(72) Inventors: Masaru Kobayashi, Chiyoda-ku (JP); Matahiko Ikeda, Chiyoda-ku (JP); Hirotoshi Maekawa, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 14/091,929

(22) Filed: Nov. 27, 2013

(65) Prior Publication Data

US 2014/0152276 A1    Jun. 5, 2014

(30) Foreign Application Priority Data

Nov. 30, 2012 (JP) ................................. 2012-262215

(51) Int. Cl.
*H02M 3/158* (2006.01)
*H02M 3/156* (2006.01)

(52) U.S. Cl.
USPC ............................ 323/225; 323/271; 323/282

(58) Field of Classification Search
USPC .......... 323/222, 225, 271, 272, 282–290, 351
See application file for complete search history.

(56) References Cited

U.S. PATENT DOCUMENTS

| | | | | |
|---|---|---|---|---|
| 7,638,904 B2 * | 12/2009 | Shoji et al. | ..................... | 307/154 |
| 8,310,218 B2 * | 11/2012 | Williams | ..................... | 323/265 |
| 2010/0045102 A1 * | 2/2010 | Kitanaka | ..................... | 307/9.1 |
| 2011/0285369 A1 * | 11/2011 | Cuk | ..................... | 323/282 |
| 2013/0069610 A1 * | 3/2013 | Hashino et al. | ............... | 323/282 |

FOREIGN PATENT DOCUMENTS

| | | |
|---|---|---|
| JP | 62-053171 A | 3/1987 |
| JP | 11-186478 A | 7/1999 |

\* cited by examiner

*Primary Examiner* — Jessica Han
(74) *Attorney, Agent, or Firm* — Sughrue Mion, PLLC

(57) ABSTRACT

A power module includes at least two pairs of two power semiconductor units (PSUs), each of which includes a switch element and a rectifier element connected in anti-parallel. One of two PSUs in one pair and one of two PSUs in another pair are connected in series between primary and secondary positive terminals of a DC/DC voltage converter. Another of two PSUs in the one pair and another of two PSUs in the another pair are connected in series between the primary positive terminal and a secondary negative terminal in a direction reverse to a direction of the ones of two PSUs. Control is performed to suppress transient voltage fluctuations that occur in switching between the state where the polarity of a reactor current is only one of positive and negative and the state where the polarity remains one of positive and negative.

11 Claims, 19 Drawing Sheets

※ SWITCH-ON CIRCUIT (1): GATE CHARGE CHARGING RATE IS HIGH
  SWITCH-ON CIRCUIT (2): GATE CHARGE CHARGING RATE IS LOW

WAVEFORMS MARKED * ARE SHOWN WITH POLARITY INVERTED

DC/DC VOLTAGE CONVERTER AND VOLTAGE CONVERSION CONTROL METHOD THEREFOR

BACKGROUND OF THE INVENTION

1. Field of the Invention

The present invention relates to a DC/DC voltage converter for converting a DC voltage into a stepped-up or stepped-down DC voltage, and a voltage conversion control method for a DC/DC voltage converter.

2. Description of the Related Art

A device for performing DC/DC voltage conversion has hitherto been used, which utilizes a switch-ON and switch-OFF operation of switch elements connected in series to perform a combination, of an operation of storing and discharging energy to and from an inductor and an operation of charging and discharging an energy transfer capacitor (see, for example, Japanese Patent Application Laid-open No. Hei 11-186478, and Mitsubishi Denki Giho, Vol. 61, No. 2, 1987).

This DC/DC voltage converter has a circuit configuration in which at least four power devices, each including a switch element and a rectifier element connected in anti-parallel thereto, are connected in series. Only half of the series-connected power devices simultaneously become the ON state (the switch element is switched ON or the rectifier element is connected in forward bias), and hence the breakdown voltages of the individual power devices can be set to be low. It is therefore possible to suppress an increase in conduction loss of each power device caused by a high breakdown voltage and to set a high handling voltage of the DC/DC voltage converter.

By the way, a DC/DC voltage converter for converting a voltage obtained by rectifying a commercial AC power supply voltage (AC 100 V or AC 200 V) or a DC/DC voltage converter for converting a voltage of approximately 100 V to 1,000 V typically includes a power device in which an insulated gate bipolar transistor (IGBT) made of silicon (Si) is used as a switch element and a PiN diode similarly made of Si is used as a rectifier element.

This type of DC/DC voltage converters may constitute a system in a combination with an inverter for converting DC into AC. Examples of the system include an electric drive system for a hybrid vehicle or an electric vehicle, a power conversion system for solar power generation, and a power conversion system for an air conditioner or the like.

The DC/DC voltage converters to be used in those systems are designed to adjust a voltage conversion ratio in accordance with the state of a power supply (such as the irradiation amount of light on a solar battery of the solar power generation system) or the state of a load (such as the rpm of a motor of the electric drive system for a hybrid vehicle), to thereby control an output voltage of the DC/DC voltage converter.

The above-mentioned conventional DC/DC voltage converter, however, has a problem in that the polarity of an inductor current IL may be only one of positive and negative or remain one of positive and negative depending on the change in load amount, which causes a discontinuous power loss of a power semiconductor unit of the DC/DC voltage converter, with the result that transient voltage fluctuations may occur in the DC/DC conversion and the performance may deteriorate.

SUMMARY OF THE INVENTION

The present invention has been made to solve the problem described above, and it is an object thereof to provide a DC/DC voltage converter for suppressing transient voltage fluctuations (deterioration in DC/DC voltage conversion performance) caused by a discontinuous power loss of a power semiconductor unit as compared to the conventional DC/DC voltage converter.

According to one embodiment of the present invention, there is provided a DC/DC voltage converter, including: a converter main circuit; and a control unit configured to control voltage conversion of the converter main circuit, the converter main circuit including: a first smoothing capacitor and a second smoothing capacitor for voltage smoothing, the first smoothing capacitor being connected between a positive terminal and a negative terminal on a primary side of the converter main circuit, the second smoothing capacitor being connected between a positive terminal and a negative terminal on a secondary side of the converter main circuit; a power module including at least two pairs of two power semiconductor units, each of which includes a switch element and a rectifier element that are connected in anti-parallel, one of the two power semiconductor units in one of the at least two pairs and one of the two power semiconductor units in another one of the at least two pairs being connected in series between the positive terminal on the primary side and the positive terminal on the secondary side, another of the two power semiconductor units in the one of the at least two pairs and another of the two power semiconductor units in the another one of the at least two pairs being connected in series between the positive terminal on the primary side and the negative terminal on the secondary side in a direction reverse to a direction of the ones of the two power semiconductor units; an energy transfer capacitor connected between a secondary-side terminal of one of the two power semiconductor units and a secondary-side terminal of another of the two power semiconductor units in the one of the at least two pairs excluding a pair of power semiconductor units closest to the secondary side; and an inductor connected between a pair of the power semiconductor units closest to the primary side and the positive terminal on the primary side, the control unit including means for performing control by switching a plurality of switch-ON circuits having different resistance values so as to increase a rate of charging electric charge of a gate capacitance of the switch element of each of the at least two pairs of two power semiconductor units when a conduction current of the inductor remains in any one of a positive polarity and a negative polarity in an operation of the converter main circuit.

According to the one embodiment of the present invention, it is possible to provide the DC/DC voltage converter for suppressing the transient voltage fluctuations (deterioration in DC/DC voltage conversion performance) caused by the discontinuous power loss of the power semiconductor unit as compared to the conventional DC/DC voltage converter.

DETAILED DESCRIPTION OF THE PREFERRED EMBODIMENTS

Figure 24:
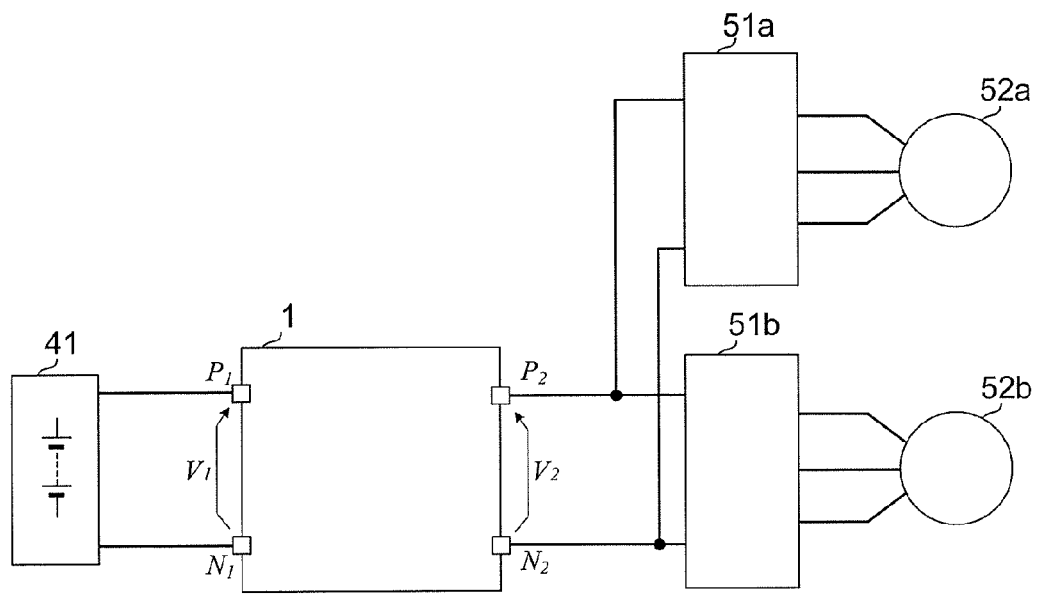
FIG. 24 is a configuration diagram of an electric drive system for a vehicle using a DC/DC voltage converter.
Figure 25:
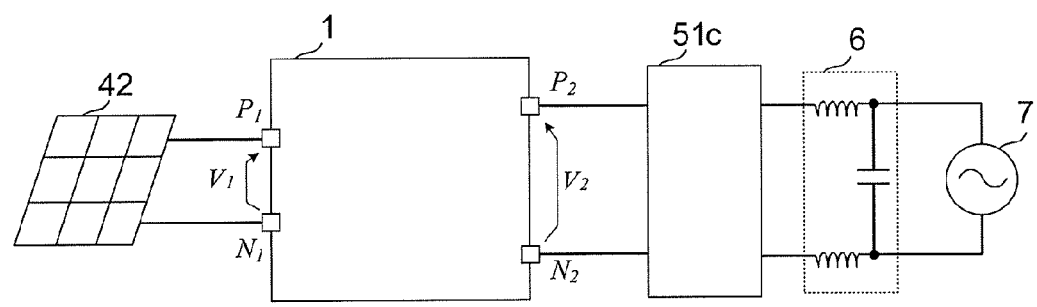
FIG. 25 is a configuration diagram of a power conversion system for solar power generation using a DC/DC voltage converter.

First, a description is given of an exemplary system that combines a DC/DC voltage converter with an inverter for converting DC into AC, such as an electric drive system for a hybrid vehicle or an electric vehicle illustrated in FIG. 24, a power conversion system for solar power generation illustrated in FIG. 25, and a power conversion system for an air conditioner or the like.

In the electric drive system of FIG. 24, a battery 41 such as a nickel-hydrogen battery, a lithium-ion battery, or a fuel battery is connected to primary-side terminals P1 and N1 of a DC/DC voltage converter 1, and inverters 51a and 51b are connected to secondary-side terminals P2 and N2 thereof. The inverter 51a is connected to a rotating machine 52a, and the inverter 51b is connected to a rotating machine 52b. The DC/DC voltage converter 1 converts a voltage of the battery 41 on the primary side from DC to DC, and supplies the converted voltage to the inverters 51a and 51b on the secondary side. The inverter 51a transmits and receives AC power to and from the rotating machine 52a, and the inverter 51b transmits and receives AC power to and from the rotating machine 52b.

In the power conversion system for solar power generation of FIG. 25, a solar battery 42 is connected to the primary-side terminals P1 and N1 of the DC/DC voltage converter 1, and an inverter 51c is connected to the secondary-side terminals P2 and N2 thereof. The inverter 51c is connected to a commercial AC power supply 7 via a filter 6. The DC/DC voltage converter 1 converts a generated voltage of the solar battery 42 on the primary side from DC to DC, and supplies the converted voltage to the inverter 51c on the secondary side. The inverter 51c converts the supplied DC voltage from DC to AC to have the amplitude and frequency of a predetermined commercial AC voltage, and supplies the converted voltage to a commercial power system as exemplified by the commercial AC power supply 7 via the filter 6.

The DC/DC voltage converters to be used in those systems are designed to, as described above, adjust the voltage conversion ratio in accordance with the state of a power supply such as the irradiation amount of light on the solar battery of the solar power generation system or the state of a load such as the rpm of a motor of the electric drive system for a hybrid vehicle, to thereby control an output voltage of the DC/DC voltage converter. However, when the load amount is changed, transient voltage fluctuations may occur in the DC/DC conversion because a power loss of a power semiconductor unit of the DC/DC voltage converter becomes discontinuous between the state in which the polarity of an inductor current IL is only one of positive and negative and the state in which the polarity of the inductor current IL remains one of positive and negative, with the result that the performance deteriorates. The present invention solves this problem.

Referring to the accompanying drawings, a DC/DC voltage converter and the like according to the present invention are described below by way of embodiments. In the embodiments, the same or corresponding parts are represented by the same reference symbols to omit overlapping descriptions.

First Embodiment

Figure 1:
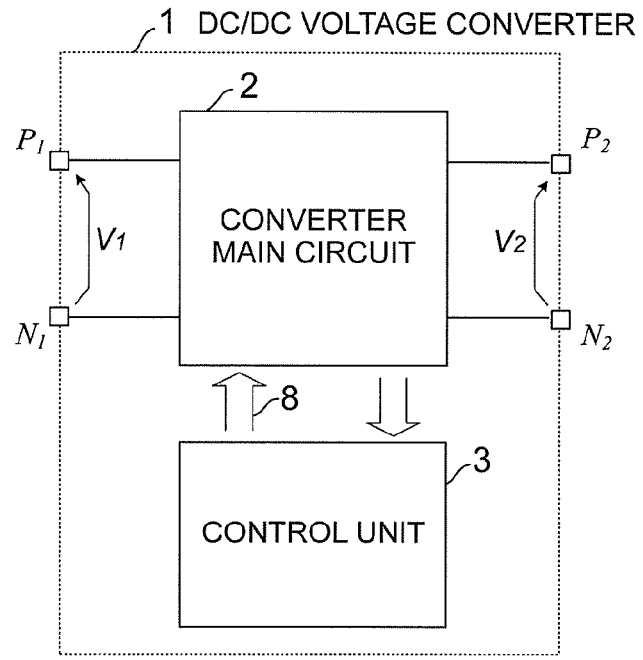
FIG. 1 is a block diagram illustrating an overall configuration of a DC/DC voltage converter according to a first embodiment of the present invention.

Referring to FIGS. 1 to 15, a DC/DC voltage converter according to a first embodiment of the present invention is now described. FIG. 1 is a block diagram illustrating an overall configuration of the DC/DC voltage converter according to the first embodiment of the present invention. A DC/DC voltage converter 1 includes a converter main circuit 2 and a control unit 3. The DC/DC voltage converter 1 includes, as connection terminals in a power path, a positive terminal P1 and a negative terminal N1 on the primary side of the converter main circuit 2 and a positive terminal P2 and a negative terminal N2 on the secondary side thereof (hereinafter sometimes abbreviated simply as "terminals").

Figure 2A:
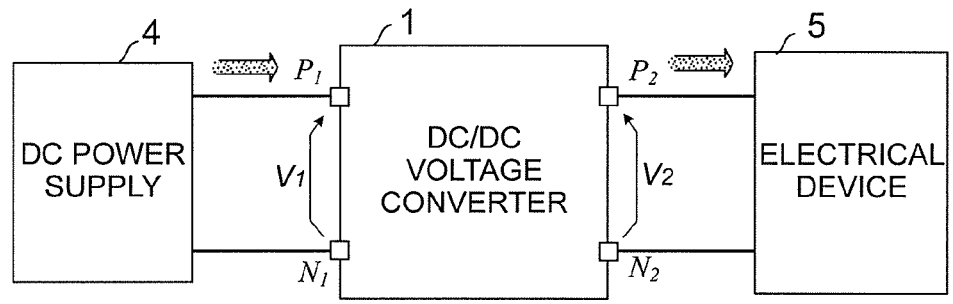
FIGS. 2A and 2B are diagrams schematically illustrating voltage conversion and the flow of electric power between the primary side and the secondary side of the DC/DC voltage converter according to the first embodiment of the present invention.
Figure 2B:
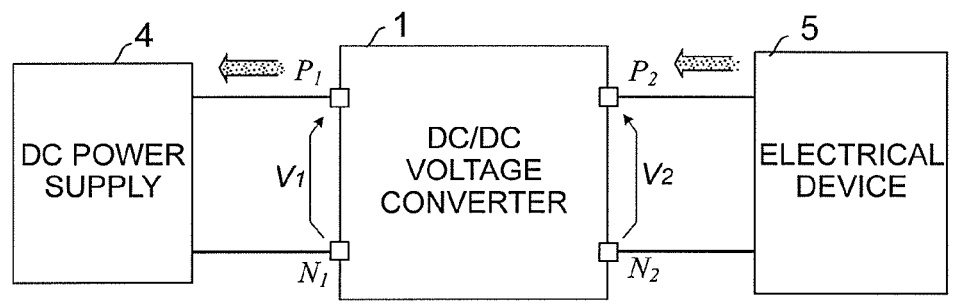

FIGS. 2A and 2B are diagrams schematically illustrating voltage conversion and the flow of electric power between the primary side and the secondary side of the DC/DC voltage converter according to the first embodiment. A DC power supply 4 is connected to the terminals P1 and N1 on the primary side of the DC/DC voltage converter 1, and an electrical device 5 is connected to the terminals P2 and N2 on the secondary side thereof.

In FIGS. 2A and 2B, the DC power supply 4 assumes a secondary battery such as a lithium-ion battery, a nickel-hydrogen battery, or a lead-acid battery, as well as a combination of an electrical double layer capacitor or a secondary battery and a power supply such as a solar battery or a fuel battery. The electrical device 5 includes an electrical load and is integrated with a power generation device or a power storage device.

The DC/DC voltage converter 1 performs voltage conversion between a primary-side terminal voltage V1 and a secondary-side terminal voltage V2 under the relationship of V1≤V2, and exchanges electric power between the primary side and the secondary side.

In the case where the DC power supply 4 is in a discharge operation and the electrical device 5 is in a power consumption operation as illustrated in FIG. 2A, the DC/DC voltage converter 1 steps up the voltage to transmit electric power in the direction from the primary side to the secondary side. In the case where the DC power supply 4 is in a charging operation and the electrical device 5 is in a power supply operation as illustrated in FIG. 2B, the DC/DC voltage converter 1 steps down the voltage to transmit electric power in the direction from the secondary side to the primary side.

In those cases, the voltage is converted by controlling ON/OFF of switch elements of power semiconductor units included in the converter main circuit 2 in accordance with a gate drive signal 8 output from the control unit 3.

Figure 3:
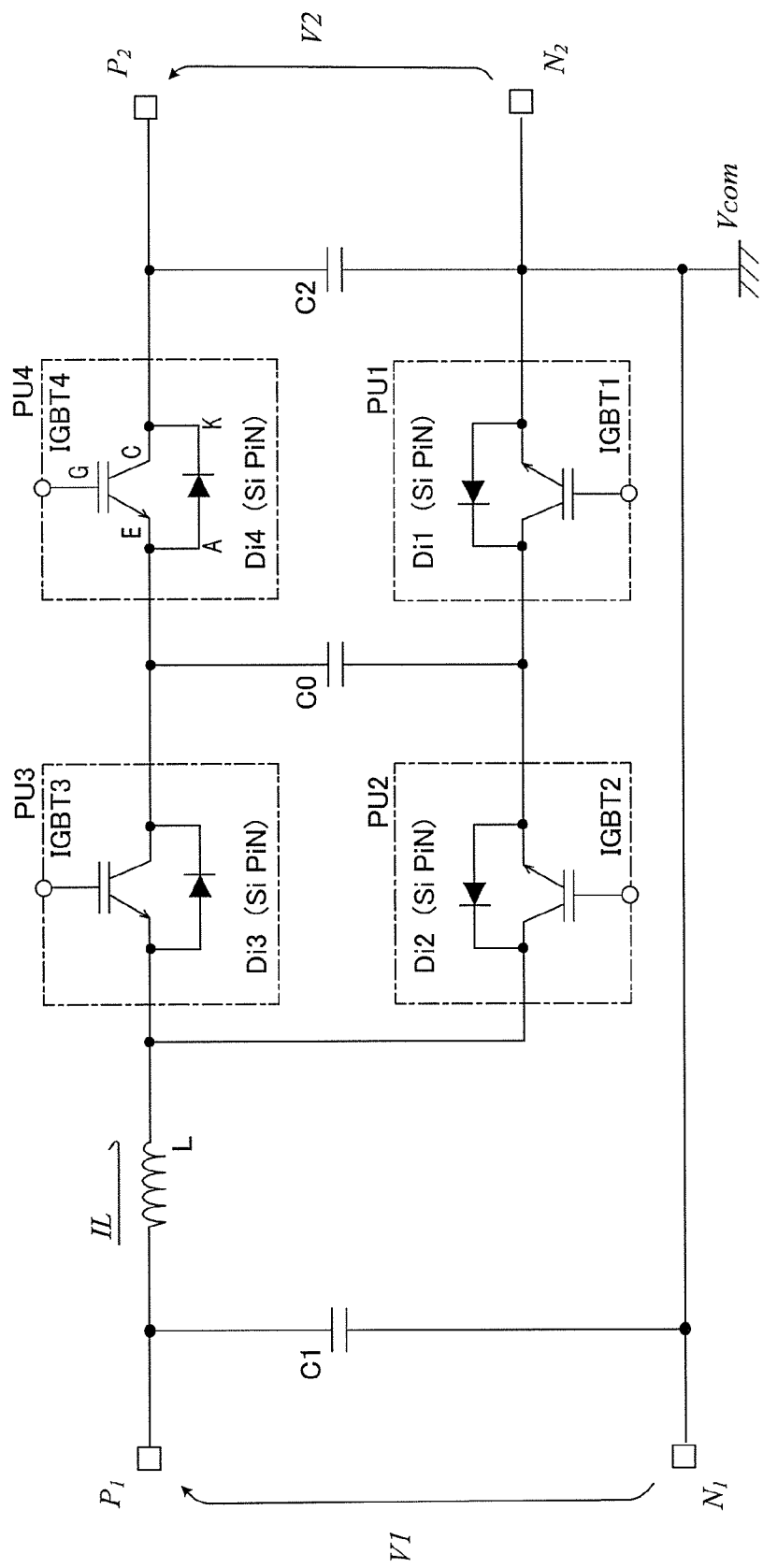
FIG. 3 is a diagram illustrating an example of circuit wiring of a converter main circuit according to the first embodiment of the present invention.

The converter main circuit 2 includes a smoothing capacitor C1 for smoothing the primary-side terminal voltage V1, a smoothing capacitor C2 for smoothing the secondary-side terminal voltage V2, an inductor L, an energy transfer capacitor C0, and power semiconductor units PU1 to PU4 each formed of a parallel connection of a switch element and a rectifier element (see FIG. 3).

Referring to FIGS. 3 to 11, the details of the operation of the DC/DC voltage converter 1 are now described. FIG. 3 is a diagram illustrating an example of circuit wiring of the converter main circuit 2. The four power semiconductor units PU1 to PU4 are connected in a manner that two pairs of two anti-parallel-connected power semiconductor units are connected in series. In this way, stepped-up power is supplied from the primary side to the secondary side, and stepped-down power is supplied from the secondary side to the primary side.

The converter main circuit 2 includes the primary-side smoothing capacitor (first smoothing capacitor) C1 for smoothing the primary-side terminal voltage V1, the secondary-side smoothing capacitor (second smoothing capacitor) C2 for smoothing the secondary-side terminal voltage V2, the inductor L and the energy transfer capacitor C0 for storing and discharging energy, and the four power semiconductor units PU1 to PU4.

The power semiconductor units PU1 to PU4 in the example of FIG. 3 employ insulated gate bipolar transistors (IGBTs), namely IGBT1, IGBT2, IGBT3, and IGBT4, made of Si as switch elements, and employ PiN diodes Di1, Di2, Di3, and Di4 made of Si as rectifier elements.

The numbers of the power semiconductor units and other components are not limited to the above. The converter main circuit 2 includes: the first and second smoothing capacitors C1 and C2 for voltage smoothing, the first smoothing capacitor C1 being connected between the positive terminal P1 and the negative terminal N1 on the primary side of the converter main circuit 2, the second smoothing capacitor C2 being connected between the positive terminal P2 and the negative terminal N2 on the secondary side thereof; a power module (PU1 to PU4) including at least two pairs of two power semiconductor units (PU), each of which is formed of a switch element (IGBT) and a rectifier element (Di) that are connected in anti-parallel, one of the two power semiconductor units in one of the pairs and one of the two power semiconductor units in another pair being connected in series between the positive terminal P1 on the primary side and the positive terminal P2 on the secondary side, another of the two power semiconductor units in the one of the pairs and another of the two power semiconductor units in the another pair being connected in series between the positive terminal P1 on the primary side and the negative terminal N2 on the secondary side in a direction reverse to a direction of the ones of the two power semiconductor units; the energy transfer capacitor (C0) connected between a secondary-side terminal of one of the two power semiconductor units and a secondary-side terminal of the other of the two power semiconductor units in the one of the at least two pairs excluding a pair of power semiconductor units closest to the secondary side of the converter main circuit 2; and the inductor (L) connected between a pair of the power semiconductor units closest to the primary side and the positive terminal P1 on the primary side.

The details of the connections in the converter main circuit 2 are subsequently described.

Two terminals of the primary-side smoothing capacitor C1 are connected to the primary-side positive terminal P1 and the primary-side negative terminal N1 of the converter main circuit 2, respectively. The negative terminal N1 is connected also to the secondary-side negative terminal N2 of the converter main circuit 2 and is grounded as Vcom. The positive terminal P1 is connected to one terminal of the smoothing capacitor C1 and one terminal of the inductor L. The other terminal of the smoothing capacitor C1 is connected to the negative terminal N1 and the ground Vcom.

Two terminals of the smoothing capacitor C2 are connected to the secondary-side positive terminal P2 and the secondary-side negative terminal N2 of the converter main circuit 2, respectively.

A collector terminal (C) of the IGBT4 of the power semiconductor unit PU4 is connected to the secondary-side positive terminal P2 of the converter main circuit 2, and an emitter terminal (E) thereof is connected to a collector terminal of the IGBT3 of the power semiconductor unit PU3. An emitter terminal of the IGBT3 is connected to a collector terminal of the IGBT2 of the power semiconductor unit PU2. An emitter terminal of the IGBT2 is connected to a collector terminal of the IGBT1 of the power semiconductor unit PU1. An emitter terminal of the IGBT1 is connected to the secondary-side negative terminal N2. The connections are made in the stated order.

The PiN diode Di4 of the power semiconductor unit PU4 is connected in anti-parallel to the IGBT4. An anode terminal (A) of the PiN diode Di4 is connected to the emitter terminal (E) of the IGBT4, and a cathode terminal (K) of the PiN diode Di4 is connected to the collector terminal (C) of the IGBT4. Similarly, the PiN diodes Di3, Di2, and Di1 are connected in anti-parallel to the IGBT3, the IGBT2, and the IGBT1, respectively.

One terminal of the energy transfer capacitor C0 is connected to a node between the IGBT4 and the IGBT3, and the other terminal thereof is connected to a node between the IGBT2 and the IGBT1.

As described above, the one terminal of the inductor L is connected to a node between the primary-side positive terminal P1 of the converter main circuit 2 and the terminal of the smoothing capacitor C1, and the other terminal thereof is connected to a node between the IGBT3 and the IGBT2.

Signal lines are connected to the converter main circuit 2 from the control unit 3 illustrated in FIGS. 1, 9, and the like to be described later so that signals for controlling ON/OFF of the IGBTs are input as gate drive signals 8 to respective gate terminals (G) of the IGBT4 to the IGBT1 as represented by Gate4, Gate3, Gate2, and Gate1 signals correspondingly to the IGBT4, the IGBT3, the IGBT2, and the IGBT1. The IGBT4, the IGBT3, the IGBT2, and the IGBT1 perform switching operations in accordance with voltage changes in Gate4 signal, Gate3 signal, Gate2 signal, and Gate1 signal, respectively.

Next, the operation of the converter main circuit 2 is described.

As described above, the DC/DC voltage converter 1 performs voltage conversion to step-up the voltage from the primary side to the secondary side or step-down the voltage from the secondary side to the primary side. The step-up operation and the step-down operation are controlled by adjusting the ON/OFF operation timings of the IGBTs by the Gate4, Gate3, Gate2, and Gate1 signals as the gate drive signals 8.

How to control the voltage conversion by the gate drive signals 8 is described below separately for the step-up operation and the step-down operation.

Step-up operation:
1) When the ON-duty cycle is less than 50%:

The ON-duty cycle relates to values for the Gate1 signal and the Gate2 signal. The Gate4 signal and the Gate3 signal are complementary to the Gate1 signal and the Gate2 signal, respectively, and hence the ON-duty cycle of the Gate3 signal and the Gate4 signal has a relationship of "100%-(ON-duty cycle of Gate1 signal and Gate2 signal)".

Figure 4:
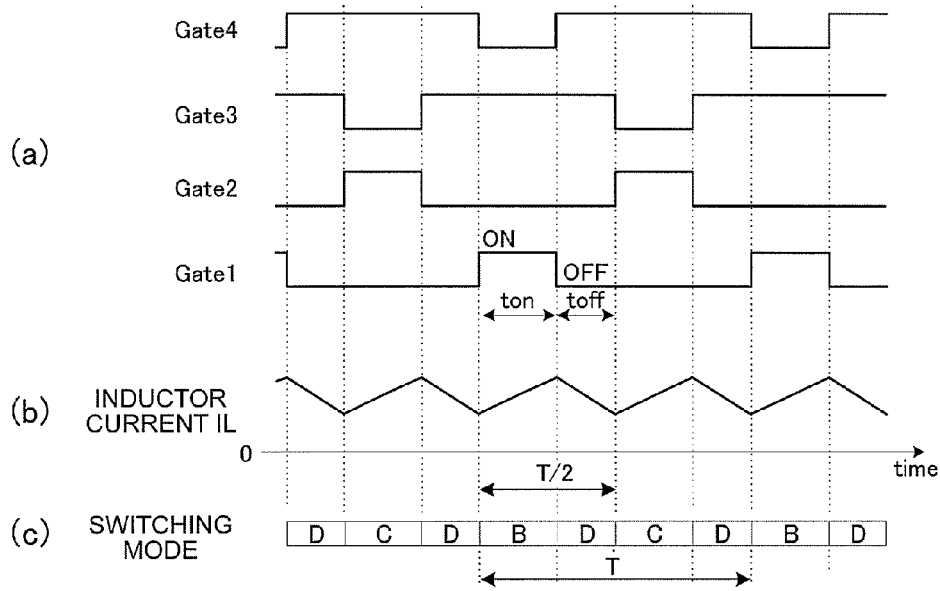
FIG. 4 is a waveform diagram showing a step-up operation (with an ON-duty cycle of less than 50%) according to the first embodiment of the present invention.

FIG. 4 shows the waveforms when the ON-duty cycle of the gate drive signals is less than 50% in the step-up operation. Part (a) of FIG. 4 shows the gate drive signals, part (b) of FIG. 4 shows the inductor current IL, and part (c) of FIG. 4 shows a switching mode and a switching timing thereof.

The polarity of the inductor current IL is defined to be positive when the inductor current IL flows through the inductor L in a direction from the connection terminal on the positive terminal P1 side to the connection terminal on the IGBT3 side.

In part (a) of FIG. 4, when the Gate1 signal is High "H", the IGBT1 is turned ON, and when the Gate2 signal is High, the IGBT2 is turned ON, with the result that a current flows from the collector to the emitter.

When the Gate3 signal is High, the IGBT3 is turned ON, and when the Gate4 signal is High, the IGBT4 is turned ON. In the step-up operation, however, a current flows through the anti-parallel-connected PiN diodes Di3 and Di4 from the anode to the cathode.

In this case, the Gate1 signal and the Gate4 signal are complementary signals, whose logics of High "H" and Low "L" are contradictory. When the Gate1 signal is High, the Gate4 signal is Low, and when the Gate1 signal is Low, the Gate4 signal is High. Note that, a dead time is provided at the switching of the logic between High and Low in order to prevent both IGBTs from being turned ON due to a response delay of the switching operation of the IGBTs.

Similarly, the Gate2 signal and the Gate3 signal are complementary signals, whose logics of High and Low are contradictory. The Gate1 signal and the Gate2 signal have a phase difference of 180 degrees. In other words, the gate drive signals 8 have two kinds of signal pairs of complementary signals, which have equal phase difference intervals.

In this case, the logic combinations of High and Low of the gate drive signals Gate1 to Gate4 are classified into three types of switching modes B, C, and D. The switching mode is switched in the order of B, D, C, D, and B.

In the switching mode B, the IGBT1 and the IGBT3 are turned ON and the IGBT2 and the IGBT4 are turned OFF, and a current flows in a path from the positive terminal P1 to the inductor L, the PiN diode Di3, the energy transfer capacitor C0, the IGBT1, and the negative terminal N1 in this order, with the result that energy is stored in the inductor L and the energy transfer capacitor C0. The electrical device 5 is applied with the voltage across the smoothing capacitor C2 stored in an operation to be described later, thereby being supplied with energy from the smoothing capacitor C2.

The current is conducted when the IGBT1 and the PiN diode Di3 are turned ON, and hence the potential at the connection terminal of the energy transfer capacitor C0 on the IGBT1 side becomes approximately Vcom=0, and the potential at the connection terminal thereof on the IGBT3 side becomes approximately VL. Consequently, the voltage VL at the connection terminal of the inductor L on the IGBT3 side becomes equal to a voltage Vc0 across the energy transfer capacitor C0.

In the switching mode D, the IGBT3 and the IGBT4 are turned ON and the IGBT1 and the IGBT2 are turned OFF, and a current flows in a path from the positive terminal P1 to the inductor L, the PiN diode Di3, the PiN diode Di4, the positive terminal P2, the electrical device 5, and the negative terminal N2 in this order, with the result that the energy stored in the inductor L is discharged.

The voltage VL becomes approximately V2 because the current is conducted through the PiN diode Di3 and the PiN diode Di4, and hence the difference between the voltage at the connection terminal of the inductor L on the IGBT3 side and the voltage at the connection terminal thereof on the positive terminal P1 side is (V1−V2) and negative, with the result that the inductor current IL decreases in the direction of IL<0.

In the switching mode C, the IGBT2 and the IGBT4 are turned ON and the IGBT1 and the IGBT3 are turned OFF, and a current flows in a path from the positive terminal P1 to the inductor L, the IGBT2, the energy transfer capacitor C0, the PiN diode Di4, the positive terminal P2, the electrical device 5, and the negative terminal N2 in this order, with the result that energy is stored in the inductor L and is discharged from the energy transfer capacitor C0. The current simultaneously flows also through the smoothing capacitor C2, and energy is stored therein.

The current is conducted when the IGBT2 and the PiN diode Di4 are turned ON, and hence the potential at the connection terminal of the energy transfer capacitor C0 on the IGBT2 side becomes approximately VL, and the potential at the connection terminal thereof on the IGBT4 side becomes approximately V2. Consequently, the voltage VL at the connection terminal of the inductor L on the IGBT3 side becomes V2−Vc0.

In this case, the ON-duty cycles of the Gate1 signal and the Gate2 signal are equal to each other, and hence the time-averaged voltages VL in the switching modes B and C are equal to each other and the relationship of Vc0−(V2−Vc0) is established. Consequently, the voltage Vc0 across the energy transfer capacitor C0 becomes V2/2, which is ½ times the secondary-side terminal voltage V2.

To sum up, the voltage VL at the connection terminal of the inductor L on the IGBT3 side is expressed by:

VL=Vc0=V2/2 in the switching mode B;

VL=(V2−Vc0)=V2/2 in the switching mode C; and

VL=V2 in the switching mode D.

Accordingly, the potential difference across the inductor L and the switch-ON time ton and the switch-OFF time toff of the IGBT1 and the IGBT2 are expressed by the following relationships.

Switching mode B, C:

$$L \cdot ILrpl = ton \cdot (V1 - V2/2) \quad (1a)$$

Switching mode D:

$$L \cdot ILrpl = -toff \cdot (V1 - V2) \quad (1b)$$

where L represents the inductance of the inductor L, and ILrpl represents the amplitude of a ripple current component (AC current component) flowing through the inductor L.

The left sides of Expression (1a) and Expression (1b) are identical, and hence the following relationship is established.

$$ton \cdot (V1 - V2/2) = toff \cdot (V2 - V1) \quad (2)$$

Expression (2) is simplified for the primary-side terminal voltage V1 and the secondary-side terminal voltage V2 as follows.

$$(V2/V1) = (ton + toff)/(ton + toff - ton + ton/2) = 1/(1 - ton/T) \quad (3)$$

where ton+toff=T/2.

The cycle T in Expression (3) represents a period of one switching cycle of the switching mode in the order of B, D, C, D, and B, and contains two ton periods and two toff periods. ton+toff is T/2.

The left side of Expression (3), V2/V1, is the ratio between the primary-side terminal voltage V1 and the secondary-side terminal voltage V2 of the DC/DC voltage converter 1, namely a DC/DC voltage conversion ratio.

In the operation in which the ON-duty cycle of the gate drive signal is less than 50% as shown in FIG. 4, ton/T<0.5 is established. When ton/T<0.5 is substituted into Expression (3), the DC/DC voltage conversion ratio is calculated to be less than 2. Consequently, V2<(V1×2) is established.

From the above description, in the switching modes B and C, the voltage VL at the connection terminal of the inductor L on the IGBT3 side is V2/2<V1, and the voltage at the connection terminal of the inductor L on the positive terminal P1 side is V1. Accordingly, the potential difference across the inductor L is positive with respect to VL, and hence the inductor current IL increases in the positive direction.

As described above, when the switching mode is switched in the order of B, D, C, D, and B, the inductor current IL in the switching modes B and C changes in the positive direction further from the state of IL≥0, and the inductor current IL in the switching mode D changes to the state of IL<0.

Accordingly, the inductor current IL is repeatedly increased and decreased twice at the cycle of T/2 in the switching cycle T of the IGBT. Specifically, an AC current having a frequency twice as high as the switching frequency of the IGBT is conducted through the inductor L.

2) When the ON-duty cycle is 50% or more:

Next, a description is given of a step-up operation in which the ON-duty cycle of the gate drive signal is 50% or more.

Figure 5:
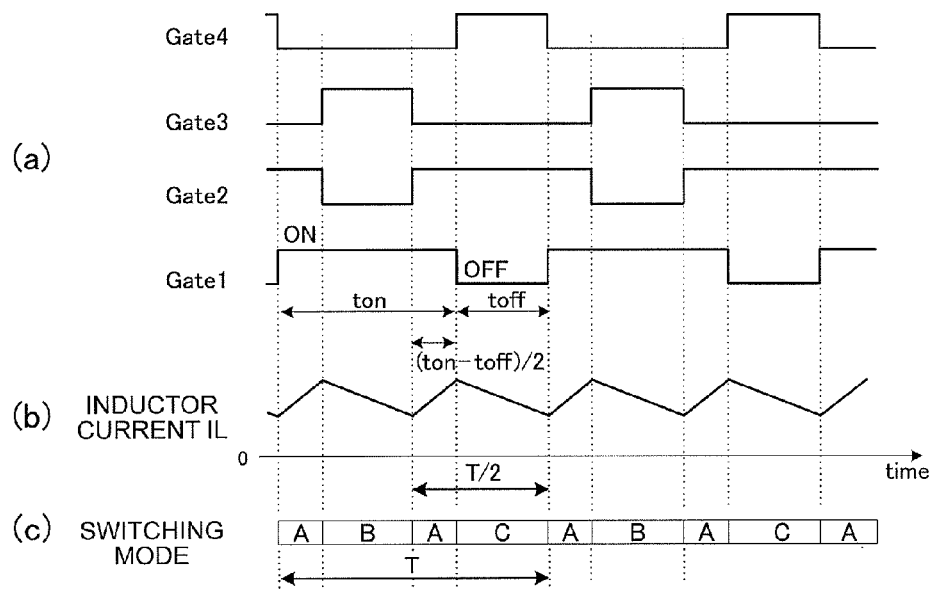
FIG. 5 is a waveform diagram showing a step-up operation (with an ON-duty cycle of 50% or more) according to the first embodiment of the present invention.

FIG. 5 shows the operation waveforms in this case. In FIG. 5, part (a) shows the gate drive signal, part (b) shows the inductor current IL, and part (c) shows the switching mode and the switching timing thereof.

In part (a) of FIG. 5, similarly to part (a) of FIG. 4, the IGBT1 is turned ON when the Gate1 signal is High "H", and the IGBT2 is turned ON when the Gate2 signal is High, with the result that a current flows from the collector to the emitter.

When the Gate3 signal is High, the IGBT3 is turned ON, and when the Gate4 signal is High, the IGBT4 is turned ON. In the step-up operation, however, a current flows through the anti-parallel-connected PiN diodes Di3 and Di4 from the anode to the cathode.

The Gate1 signal and the Gate4 signal are complementary signals, and the Gate2 signal and the Gate3 signal are complementary signals. A dead time is provided at the switching of the logic between High and Low in order to prevent both IGBTs from being turned ON due to a response delay of the switching operation of the IGBTs. The Gate1 signal and the Gate2 signal have a phase difference of 180 degrees.

In this case, the logic combinations of High and Low of the gate drive signals Gate1 to Gate4 are classified into three types of switching modes A, B, and C. The switching mode is switched in the order of A, B, A, C, and A.

First, in the switching mode A, the IGBT1 and the IGBT2 are turned ON and the IGBT3 and the IGBT4 are turned OFF, and a current flows in a path from the positive terminal P1 to the inductor L, the IGBT2, the IGBT1, and the negative terminal N1 in this order, with the result that energy is stored in the inductor L.

The voltage VL becomes approximately Vcom=0 because the current is conducted through the IGBT1 and the IGBT2, and hence the difference between the voltage VL at the connection terminal of the inductor L on the IGBT2 side and the voltage at the connection terminal thereof on the positive terminal P1 side is (V1−0) and positive, with the result that the inductor current IL increases in the positive direction.

In the switching mode B, the IGBT1 and the IGBT3 are turned ON and the IGBT2 and the IGBT4 are turned OFF, and a current flows in a path from the positive terminal P1 to the inductor L, the PiN diode Di3, the energy transfer capacitor C0, the IGBT1, and the negative terminal N1 in this order, with the result that energy is discharged from the inductor L and stored in the energy transfer capacitor C0. The electrical device 5 is applied with the voltage across the smoothing capacitor C2 stored in an operation to be described later, thereby being supplied with energy from the smoothing capacitor C2.

The current is conducted when the IGBT1 and the PiN diode Di3 are turned ON, and hence the potential at the connection terminal of the energy transfer capacitor C0 on the IGBT1 side becomes approximately Vcom=0, and the potential at the connection terminal thereof on the IGBT3 (PiN diode 3) side becomes approximately VL.

Consequently, the voltage VL at the connection terminal of the inductor L on the IGBT3 (PiN diode 3) side becomes equal to Vc0.

In the switching mode C, the IGBT2 and the IGBT4 are turned ON and the IGBT1 and the IGBT3 are turned OFF, and a current flows in a path from the positive terminal P1 to the inductor L, the IGBT2, the energy transfer capacitor C0, the PiN diode Di4, the positive terminal P2, the electrical device 5, and the negative terminal N2 in this order, with the result that energy is discharged from the inductor L and the energy transfer capacitor C0.

The current is conducted when the IGBT2 and the PiN diode Di4 are turned ON, and hence the potential at the connection terminal of the energy transfer capacitor C0 on the IGBT2 side becomes approximately VL, and the potential at the connection terminal thereof on the IGBT4 (PiN diode Di4) side becomes approximately V2.

Consequently, the voltage VL at the connection terminal of the inductor L on the IGBT3 side becomes V2−Vc0.

Further, similarly to the above-mentioned operation in which the ON-duty cycle is less than 50%, the ON-duty cycles of the Gate1 signal and the Gate2 signal are equal to each other, and hence the time-averaged voltages VL in the switching modes B and C are equal to each other and the relationship of Vc0=(V2−Vc0) is established. Consequently, the voltage Vc0 across the energy transfer capacitor C0 becomes V2/2, which is ½ times the secondary-side terminal voltage V2.

To sum up, the voltage VL at the connection terminal of the inductor L on the IGBT3 side is expressed by:

$VL=0$ in the switching mode $A$;

$VL=Vc0=V2/2$ in the switching mode $B$; and $VL=(V2-Vc0)=V2/2$ in the switching mode $C$.

Accordingly, the potential difference across the inductor L and the switch-ON time ton and the switch-OFF time toff of the IGBT1 and the IGBT2 are expressed by the following relationships.

Switching mode A:

$$L \cdot ILrpl=(ton-toff)/2 \cdot V1 \quad (4a)$$

Switching mode $B, C$:

$$L \cdot ILrpl=-toff \cdot (V1-V2/2) \quad (4b)$$

The left sides of Expression (4a) and Expression (4b) are identical, and hence the following relationship is established.

$$(ton-toff)/2 \cdot V1=-toff \cdot (V1-V2/2) \quad (5)$$

Expression (5) is simplified for the primary-side terminal voltage V1 and the secondary-side terminal voltage V2 as follows.

$$(V2/V1)=(ton+toff)/toff=1/(1-ton/T) \quad (6)$$

where ton+toff=T.

The cycle T in Expression (6) represents a period of one switching cycle of the switching mode in the order of A, B, A, C, and A, and contains one ton period and one toff period. ton+toff is T.

Expression (6) is identical to Expression (3). In other words, the DC/DC voltage conversion ratio is adjusted continuously in accordance with the change in ON-duty cycle, irrespective of whether the ON-duty cycle is less than 50% or 50% or more.

Note that, in the operation in which the ON-duty cycle of the gate drive signal is 50% or more as shown in FIG. 5, ton/T≥0.5 is established. When ton/T≥0.5 is substituted into Expression (6), the DC/DC voltage conversion ratio is calculated to be 2 or more. Consequently, V2≥(V1×2) is established.

From the above description, in the switching modes B and C, the voltage VL at the connection terminal of the inductor L on the IGBT3 side is V2/2≥V1, and the voltage at the connection terminal of the inductor L on the positive terminal P1 side is V1. Accordingly, the potential difference across the inductor L is negative with respect to VL, and hence the inductor current IL increases in the negative direction.

As described above, when the switching mode is switched in the order of A, B, A, C, and A, the inductor current IL in the switching mode A changes to increase further in the positive direction from the state of IL≥0, and the inductor current IL in the switching modes B and C changes to the state of IL<0.

Accordingly, the inductor current IL is repeatedly increased and decreased twice at the cycle of T/2 in the switching cycle T of the IGBT. Specifically, also in the case where the ON-duty cycle of the gate drive signal is 50% or more, an AC current having a frequency twice as high as the switching frequency of the IGBT is conducted through the inductor L.

Next, the step-down operation is described below.

Step-down operation:

1) When the ON-duty cycle is less than 50%:

In the step-down operation, as illustrated in FIG. 2B, electric power generated by the electrical device 5 connected to the secondary side of the DC/DC voltage converter 1 is subjected to DC/DC voltage conversion from V2 to V1 under the relationship of "voltage V1≤voltage V2" and is recovered by the DC power supply 4.

Figure 6:
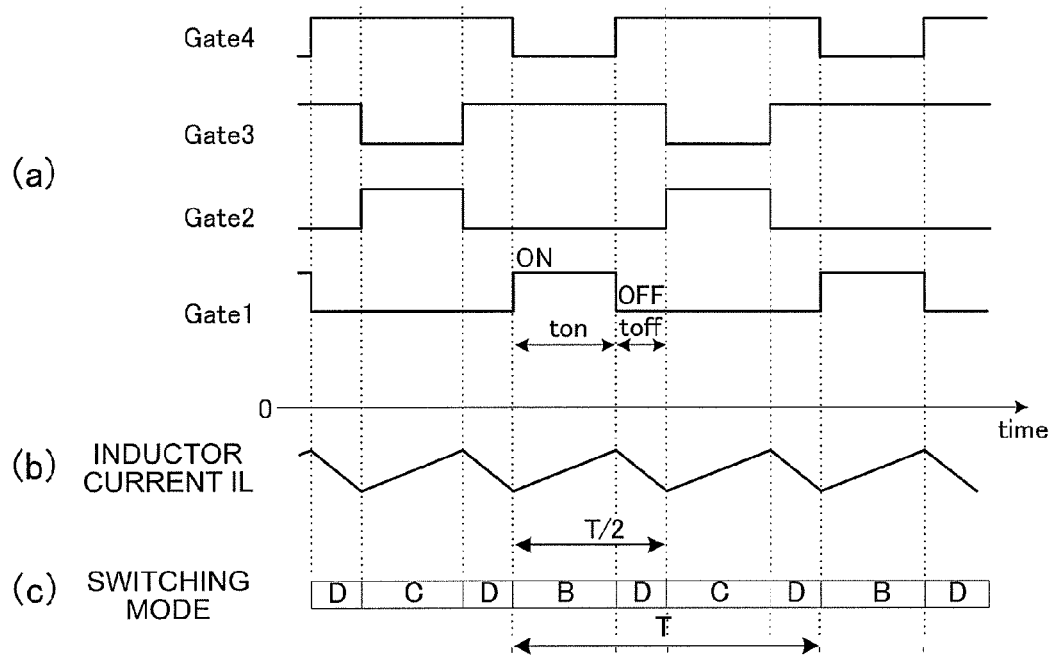
FIG. 6 is a waveform diagram showing a step-down operation (with an ON-duty cycle of less than 50%) according to the first embodiment of the present invention.

FIG. 6 shows the waveforms when the ON-duty cycle of the gate drive signals is less than 50% in the step-down operation. Part (a) of FIG. 6 shows the gate drive signals, part (b) of FIG. 6 shows the inductor current IL, and part (c) of FIG. 6 shows a switching mode and a switching timing thereof.

In part (a) of FIG. 6, when the Gate3 signal is High, the IGBT3 is turned ON, and when the Gate4 signal is High, the IGBT4 is turned ON, with the result that a current flows from the collector to the emitter. When the Gate1 signal is High, the IGBT1 is turned ON, and when the Gate2 signal is High, the IGBT2 is turned ON.

In the step-down operation, however, a current flows through the anti-parallel-connected PiN diodes Di1 and Di2 from the anode to the cathode.

The gate drive signal shown in part (a) of FIG. 6 and the switching mode and the switching timing thereof shown in part (c) of FIG. 6 are the same as those shown in part (a) of FIG. 4 and part (c) of FIG. 4 in the case where the ON-duty cycle of the gate drive signal is less than 50% in the step-up operation.

In other words, the gate drive signal has the same waveform both in the step-down operation and in the step-up operation, and the logic combinations of High and Low of the gate drive signals Gate1 to Gate4 are switched in the order of B, D, C, D, and B.

In the switching mode D, the IGBT3 and the IGBT4 are turned ON and the IGBT1 and the IGBT2 are turned OFF, and a current flows in a path from the positive terminal P2 to the IGBT4, the IGBT3, the inductor L, the positive terminal P1, the DC power supply 4, and the negative terminal N1 in this order, with the result that energy is stored in the inductor L. As indicated by the direction of the current conduction, the polarity of the inductor current IL is negative.

The current is conducted when the IGBT3 and the IGBT4 are turned ON, and hence the voltage VL becomes approximately V2.

Consequently, the difference between the voltage at the connection terminal of the inductor L on the IGBT3 side and the voltage at the connection terminal thereof on the positive terminal P1 side is (V1−V2) and negative, with the result that the inductor current IL increases in the negative direction from the state of IL<0.

In the switching mode B, the IGBT1 and the IGBT3 are turned ON and the IGBT2 and the IGBT4 are turned OFF, and a current flows in a path from the energy transfer capacitor C0 to the IGBT3, the inductor L, the positive terminal P1, the DC power supply 4, the negative terminal N1, and the PiN diode Di1 in this order, with the result that energy is discharged from the inductor L and the energy transfer capacitor C0. The smoothing capacitor C2 is applied with the generated voltage V2 of the electrical device 5, and energy is supplied to the smoothing capacitor C2.

The current is conducted when the IGBT1 (PiN diode Di1) and the IGBT3 are turned ON, and hence the potential at the connection terminal of the energy transfer capacitor C0 on the IGBT1 (PiN diode Di1) side becomes approximately Vcom=0, and the potential at the connection terminal thereof on the IGBT3 side becomes approximately VL.

Consequently, the voltage VL at the connection terminal of the inductor L on the IGBT3 side becomes equal to Vc0.

In the switching mode C, the IGBT2 and the IGBT4 are turned ON and the IGBT1 and the IGBT3 are turned OFF, and a current flows in a path from the positive terminal P2 to the IGBT4, the energy transfer capacitor C0, the PiN diode Di2, the inductor L, the positive terminal P1, the DC power supply 4, and the negative terminal N1 in this order, with the result that energy is discharged from the inductor L and is stored in the energy transfer capacitor C0.

The current is conducted when the PiN diode Di2 and the IGBT4 are turned ON, and hence the potential at the connection terminal of the energy transfer capacitor C0 on the IGBT2 (PiN diode Di2) side becomes approximately VL, and the potential at the connection terminal thereof on the IGBT4 side becomes approximately V2.

Consequently, the voltage VL at the connection terminal of the inductor L on the IGBT3 side becomes V2−Vc0.

In this case, the ON-duty cycles of the Gate3 signal and the Gate4 signal are equal to each other, and hence the time-averaged voltages VL in the switching modes B and C are equal to each other and the relationship of Vc0=(V2−Vc0) is established.

Consequently, similarly to the step-up operation, the voltage Vc0 across the energy transfer capacitor C0 becomes V2/2, which is ½ times the secondary-side terminal voltage V2.

To sum up, the voltage VL at the connection terminal of the inductor L on the IGBT3 side is expressed by:

$$VL=Vc0=V2/2 \text{ in the switching mode } B;$$

$$VL=(V2-Vc0)=V2/2 \text{ in the switching mode } C; \text{ and}$$

$$VL=V2 \text{ in the switching mode } D.$$

Accordingly, the potential difference across the inductor L and the switch-ON time ton and the switch-OFF time toff of the IGBT1 and the IGBT2 are identical to those in Expressions (1a) and (1b) representing the relationships in the case where the ON-duty cycle of the gate drive signal is less than 50% in the step-up operation.

Consequently, the relationships of Expressions (2) and (3) are established similarly.

In other words, the voltage conversion ratio (V2/V1) of the DC/DC voltage converter 1 is expressed by Expression (3).

In the operation of FIG. 6 in which the ON-duty cycle of the gate drive signal is less than 50%, ton/T<0.5 is established. When ton/T<0.5 is substituted into Expression (3), the DC/DC voltage conversion ratio is calculated to be less than 2. Accordingly, V2<(V1×2) is established. In other words, the primary-side terminal voltage V1 is stepped down to a voltage higher than ½ times and lower than 1 time the secondary-side terminal voltage V2.

From the above description, in the switching modes B and C, the voltage VL at the connection terminal of the inductor L on the IGBT3 side is V2/2<V1, and the voltage at the connection terminal of the inductor L on the positive terminal P1 side is V1. Accordingly, the potential difference across the inductor L is positive with respect to VL, and hence the inductor current IL decreases in the positive direction. In other words, the inductor current IL changes from the state of IL<0 to the state of IL≥0 in the step-down operation.

As described above, in the switching of the switching mode in the order of B, D, C, D, and B, the inductor current IL in the switching modes B and C changes to the state of IL≥0, and the inductor current IL in the switching mode D changes to increase further in the negative direction from the state of IL<0.

Accordingly, the inductor current IL is repeatedly increased and decreased twice at the cycle of T/2 in the switching cycle T of the IGBT. Specifically, similarly to the step-up operation, an AC current having a frequency twice as high as the switching frequency of the IGBT is conducted through the inductor L.

2) When the ON-duty cycle is 50% or more:

Next, a description is given of a step-down operation in which the ON-duty cycle of the gate drive signal is 50% or more.

Figure 7:
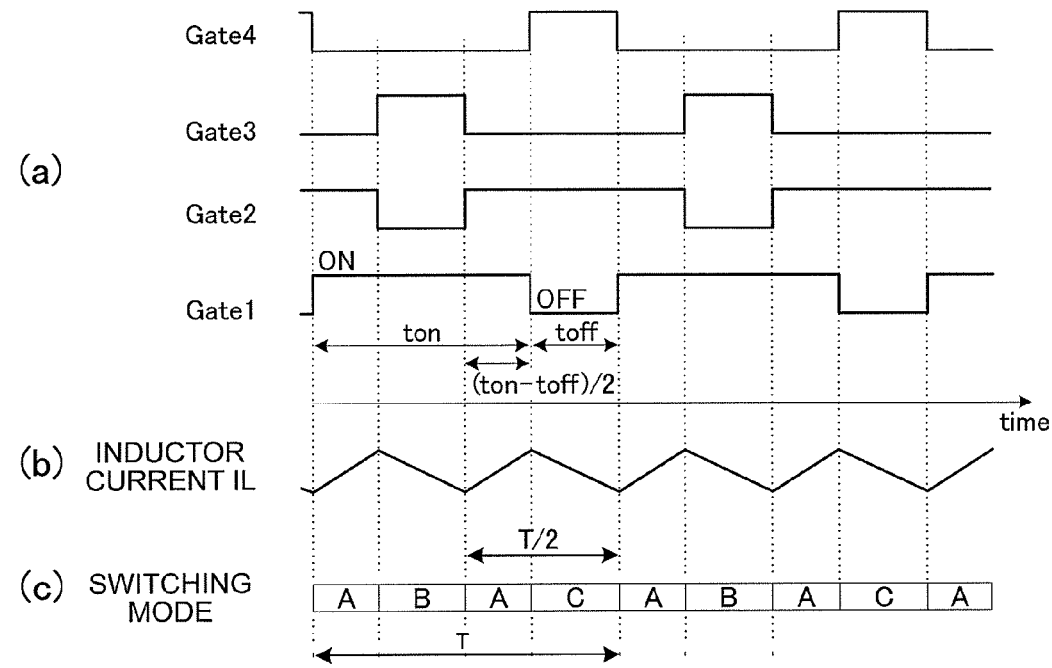
FIG. 7 is a waveform diagram showing a step-down operation (with an ON-duty cycle of 50% or more) according to the first embodiment of the present invention.

FIG. 7 shows the operation waveforms in this case. In FIG. 7, part (a) shows the gate drive signal, part (b) shows the inductor current IL, and part (c) shows the switching mode and the switching timing thereof.

In part (a) of FIG. 7, the IGBT3 is turned ON when the Gate3 signal is High, and the IGBT4 is turned ON when the Gate4 signal is High, with the result that a current flows from the collector to the emitter.

When the Gate1 signal is High, the IGBT1 is turned ON, and when the Gate2 signal is High, the IGBT2 is turned ON. In the step-down operation, however, a current flows through the anti-parallel-connected PiN diodes Di1 and Di2 from the anode to the cathode.

The gate drive signal shown in part (a) of FIG. 7 and the switching mode and the switching timing thereof shown in part (c) of FIG. 7 are the same as those shown in part (a) of FIG. 5 and part (c) of FIG. 5 in the case where the ON-duty cycle of the gate drive signal is 50% or more in the step-up operation.

In other words, the gate drive signal has the same waveform both in the step-down operation and in the step-up operation, and the logic combinations of High and Low of the gate drive signals Gate1 to Gate4 are switched in the order of the switching modes A, B, A, C, and A.

First, in the switching mode C, the IGBT2 and the IGBT4 are turned ON and the IGBT1 and the IGBT3 are turned OFF, and a current flows in a path from the positive terminal P2 to the IGBT4, the energy transfer capacitor C0, the PiN diode Di2, the inductor L, the DC power supply 4, and the negative terminal N1 in this order, with the result that energy is stored in the inductor L and the energy transfer capacitor C0.

The current is conducted when the IGBT2 (PiN diode Di2) and the IGBT4 are turned ON, and hence the potential at the connection terminal of the energy transfer capacitor C0 on the IGBT2 side becomes approximately VL, and the potential at the connection terminal thereof on the IGBT4 side becomes approximately V2.

Consequently, the voltage VL at the connection terminal of the inductor L on the IGBT3 side becomes V2−Vc0.

In the switching mode B, the IGBT1 and the IGBT3 are turned ON and the IGBT2 and the IGBT4 are turned OFF, and a current flows in a path from the energy transfer capacitor C0 to the IGBT3, the inductor L, the positive terminal P1, the DC power supply 4, the negative terminal N1, and the PiN diode Di1 in this order, with the result that energy is stored in the inductor L and is discharged from the energy transfer capacitor C0.

The current is conducted when the IGBT1 (PiN diode Di1) and the IGBT3 are turned ON, and hence the potential at the connection terminal of the energy transfer capacitor C0 on the IGBT1 side becomes approximately Vcom=0, and the potential at the connection terminal thereof on the IGBT3 side becomes approximately VL.

Consequently, the voltage VL at the connection terminal of the inductor L on the IGBT3 side becomes Vc0.

In the switching mode A, the IGBT1 and the IGBT2 are turned ON and the IGBT3 and the IGBT4 are turned OFF, and a current flows in a path from the inductor L to the positive terminal P1, the DC power supply 4, the negative terminal N1, the PiN diode Di1, and the PiN diode Di2 in this order, with the result that energy is discharged from the inductor L.

The voltage VL becomes approximately Vcom=0 because the current is conducted through the PiN diode Di1 and the PiN diode Di2, and hence the difference between the voltage VL at the connection terminal of the inductor L on the IGBT2 side and the voltage at the connection terminal thereof on the positive terminal P1 side is V1 and positive, with the result that the inductor current IL changes in the positive direction from the state of IL<0.

Further, similarly to the above-mentioned operation in which the ON-duty cycle is less than 50%, the ON-duty cycles of the Gate3 signal and the Gate4 signal are equal to each other, and hence the time-averaged voltages VL in the switching modes B and C are equal to each other and the relationship of Vc0=(V2−Vc0) is established. Consequently, similarly to the step-up operation, the voltage Vc0 across the energy transfer capacitor C0 becomes V2/2, which is ½ times the secondary-side terminal voltage V2.

To sum up, the voltage VL at the connection terminal of the inductor L on the IGBT3 side is expressed by:

$VL=Vcom=0$ in the switching mode $A$;

$VL=Vc0=V2/2$ in the switching mode $B$; and $VL=(V2−Vc0)=V2/2$ in the switching mode $C$.

Accordingly, the relationships of the potential difference across the inductor L and the switch-ON time ton and the switch-OFF time toff of the IGBT1 and the IGBT2 are identical to those in Expressions (4a) and (4b) representing the relationships in the case where the ON-duty cycle of the gate drive signal is 50% or more in the step-up operation. Consequently, the relationships of Expressions (5) and (6) are established similarly.

In other words, the voltage conversion ratio (V2/V1) of the DC/DC voltage converter 1 is expressed by Expression (6).

In the operation of FIG. 7 in which the ON-duty cycle of the gate drive signal is 50% or more, ton/T≥0.5 is established. When ton/T≥0.5 is substituted into Expression (6), the DC/DC voltage conversion ratio is calculated to be 2 or more. Accordingly, V2≥(V1×2) is established. In other words, the primary-side terminal voltage V1 is stepped down to a voltage lower than ½ times the secondary-side terminal voltage V2.

From the above description, in the switching modes B and C, the voltage VL at the connection terminal of the inductor L on the IGBT3 side is V2/2≥V1, and the voltage at the connection terminal of the inductor L on the positive terminal P1 side is V1. Accordingly, the potential difference across the inductor L is negative with respect to VL, and hence the inductor current IL increases in the negative direction. In other words, the inductor current IL changes to increase further in the negative direction from the state of IL<0 in the step-down operation.

As described above, in the switching of the switching mode in the order of A, B, A, C, and A, the inductor current IL in the switching mode A changes to the state of IL≥0, and the inductor current IL in the switching modes B and C changes to increase further in the negative direction from the state of IL<0.

Accordingly, the inductor current IL is repeatedly increased and decreased twice at the cycle of T/2 in the switching cycle T of the IGBT. Specifically, also in the case where the ON-duty cycle of the gate drive signal is 50% or more an AC current having a frequency twice as high as the switching frequency of the IGBT is conducted through the inductor L.

Subsequently, the operation of the control unit 3 is described with reference to FIG. 9. FIG. 9 is a block diagram illustrating the configurations of the control unit 3 and the converter main circuit 2.

The control unit 3 performs an internal control operation by externally inputting the primary-side terminal voltage V1 and the secondary-side terminal voltage V2 of the converter main circuit 2 and the inductor current IL (for example, from detectors (not shown) for detecting V1, V2, and IL, which are included in the converter main circuit 2 of FIG. 3) and inputting a DC/DC voltage conversion ratio command from an external device (not shown), and outputs gate drive signals 8 (Gate4, Gate3, Gate2, and Gate1) for controlling the switching operations of the IGBT4, the IGBT3, the IGBT2, and the IGBT1 of the converter main circuit 2.

A conversion control section 10 and a gate PWM generating section 11 may be formed of a microcomputer or the like.

The primary-side terminal voltage V1, the secondary-side terminal voltage V2, the inductor current IL, and the DC/DC voltage conversion ratio command, which are input to the control unit 3, are input to the conversion control section 10. The conversion control section 10 calculates a voltage conversion ratio of the actually operating converter main circuit 2 based on the ratio between the secondary-side terminal voltage V2 and the primary-side terminal voltage V1, and compares the calculated voltage conversion ratio to the DC/DC voltage conversion ratio command supplied from the external device, to thereby calculate a target amount Lduty of the ON-duty cycle of the IGBT1 and the IGBT2 by negative feedback control operation using known proportional-integral (PI) operation or the like. Lduty represents a linearly interpolated value in the range of from 0% as a lower limit of the duty cycle to 100% as an upper limit thereof, and takes, for example, 0.0 when the duty cycle is 0% and 1.0 when the duty cycle is 100%. The inductor current IL is used in a control operation loop included in the above-mentioned negative feedback control operation of the voltage conversion ratio, specifically, as an input amount of the negative feedback control operation involving the comparison between an inductor current IL_ref and the inductor current IL.

By applying this minor negative feedback control operation of the inductor current, a peripheral negative feedback control system for the DC/DC voltage conversion ratio can be set to have a high frequency control band, and hence the tracking response of the conversion ratio control to the voltage conversion ratio command is improved.

Next, Lduty is input to the gate PWM generating section 11. The gate PWM generating section 11 performs pulse width modulation corresponding to the value of Lduty, and generates and outputs rectangular gate PWM signals Gpwm1, Gpwm2, Gpwm3, and Gpwm4 as original signals of the gate drive signals 8 (Gate4, Gate3, Gate2, and Gate1) shown in part (a) of FIG. 4, part (a) of FIG. 5, part (a) of FIG. 6, and part (a) of FIG. 7. Those gate PWM signals are generated by, for example, a triangular wave comparison method involving the magnitude comparison between Lduty and a triangular wave whose frequency is the switching frequency of the switch element and amplitude is 1.0.

The gate PWM signals Gpwm1, Gpwm2, Gpwm3, and Gpwm4 are input to a gate drive section 12. The gate drive section 12 outputs the gate drive signal 8 for turning ON and OFF the switch element in accordance with the logic of the gate PWM signal. The gate drive section 12 needs to exchange the gate PWM signals to and from the gate PWM generating section 11, and therefore receives the signals in the state in which the signals are insulated from one another. The reason is as follows. The emitter potentials of the IGBT4, the IGBT3, the IGBT2, and the IGBT1 have individual values, and, in order to switch ON and OFF the IGBT4, the IGBT3, the IGBT2, and the IGBT1, it is necessary to operate the gate potentials with reference to the respective emitter potentials of the IGBTs. The gate PWM generating section 11, on the other hand, generates and outputs the gate PWM signals with the same reference potential.

In order to operate the IGBTs having the individual emitter potentials as described above, the gate drive section 12 is divided into a gate drive circuit (1) 121, a gate drive circuit (2) 122, a gate drive circuit (3) 123, and a gate drive circuit (4) 124.

The signals of the gate drive circuits 121 to 124 are connected to the emitter potentials of the corresponding IGBT1 to IGBT4, and the gate drive circuits 121 to 124 control the IGBTs to be switched ON and OFF by switching whether the voltage of the gate drive signal 8 is set to the power supply voltages VD1 to VD4 or the emitter potentials. Also the power supply voltages VD1 to VD4 need to be supplied individually correspondingly to the IGBT1 to IGBT4, and hence the four kinds of power supply voltages VD1, VD2, VD3, and VD4 insulated from one another are generated by a gate power supply circuit 13 and are supplied to the gate drive circuit (1) 121, the gate drive circuit (2) 122, the gate drive circuit (3) 123, and the gate drive circuit (4) 124, respectively.

The gate drive circuit (1) 121 outputs the Gate1 signal to switch the IGBT1, the gate drive circuit (2) 122 outputs the Gate2 signal to switch the IGBT2, the gate drive circuit (3) 123 outputs the Gate3 signal to switch the IGBT3, and the gate drive circuit (4) 124 outputs the Gate4 signal to switch the IGBT4.

Figure 8:
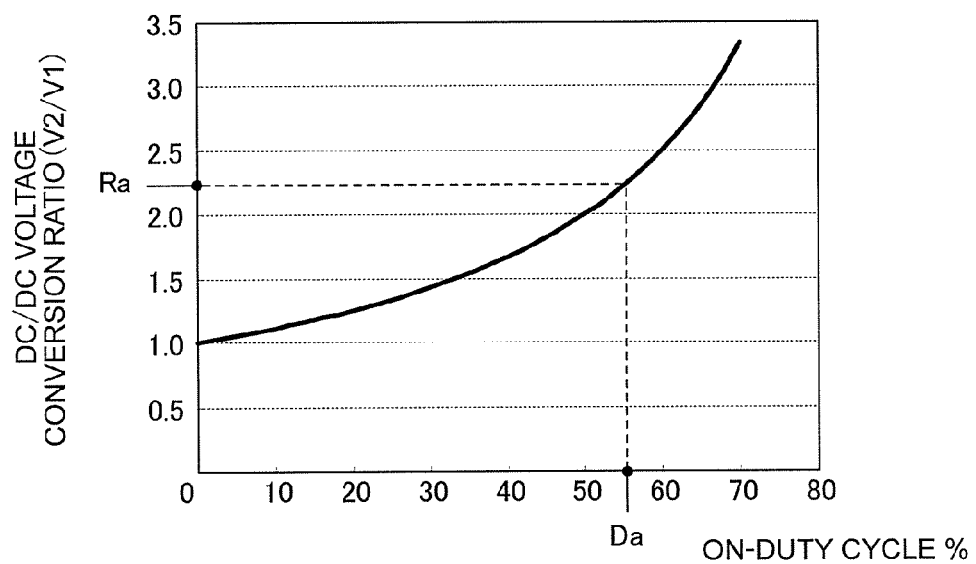
FIG. 8 is a characteristics graph showing a relationship between an ON-duty cycle and a DC/DC voltage conversion ratio according to the present invention.

The relationship between the ON-duty cycles of the IGBT1 and the IGBT2 and the DC/DC voltage conversion ratio has the characteristics shown in FIG. 8 based on Expression (6). As described above, in the DC/DC voltage converter 1, the control unit 3 performs the operation so as to follow the DC/DC voltage conversion ratio command supplied from the external device (not shown), and, in the steady state, outputs the gate drive signal 8 at the ON-duty cycle corresponding to the DC/DC voltage conversion ratio specified by the characteristics line of FIG. 8, to thereby control the switch-ON and switch-OFF of the switch element of the converter main circuit 2.

Note that, for example, data (table) on the characteristics of FIG. 8 determined in advance may be stored in a memory section (not shown) of the control unit 3, and the ON-duty cycle may be determined based on the data.

When the ON-duty cycle is 0%, the primary-side terminal voltage V1 and the secondary-side terminal voltage V2 of the DC/DC voltage converter 1 becomes equal to each other. As the ON-duty cycle becomes larger, the voltage conversion ratio V2/V1 becomes larger. In the step-up operation, electric power is transmitted from the primary side to the secondary side at the step-up ratio V2/V1 in the range of 1.0 or more. In the step-down operation, electric power is transmitted from the secondary side to the primary side at the step-down ratio V1/V2 in the range of 1.0 or less.

Figure 12:
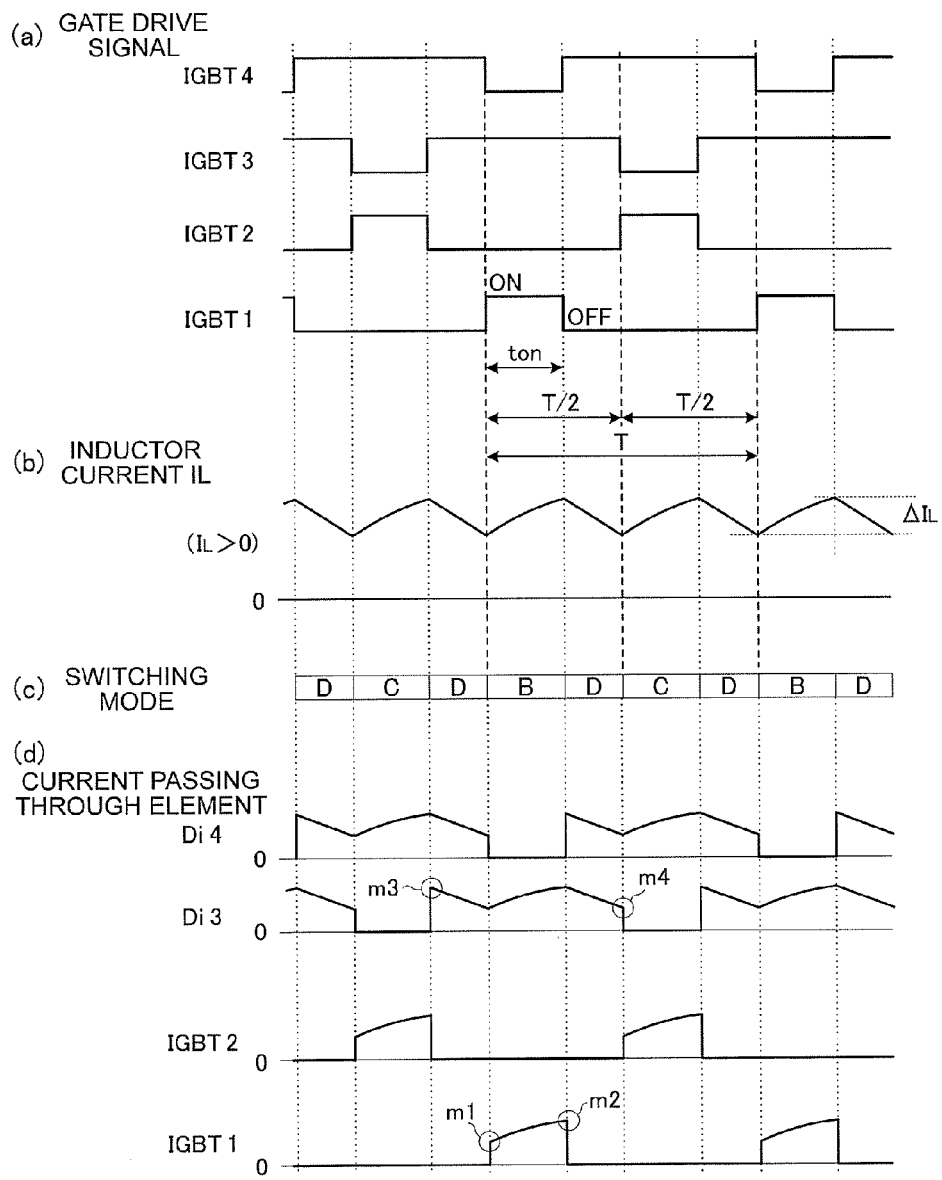
FIG. 12 is a waveform diagram showing an operation in which an inductor current remains in the positive polarity according to the first embodiment of the present invention.
Figure 13:
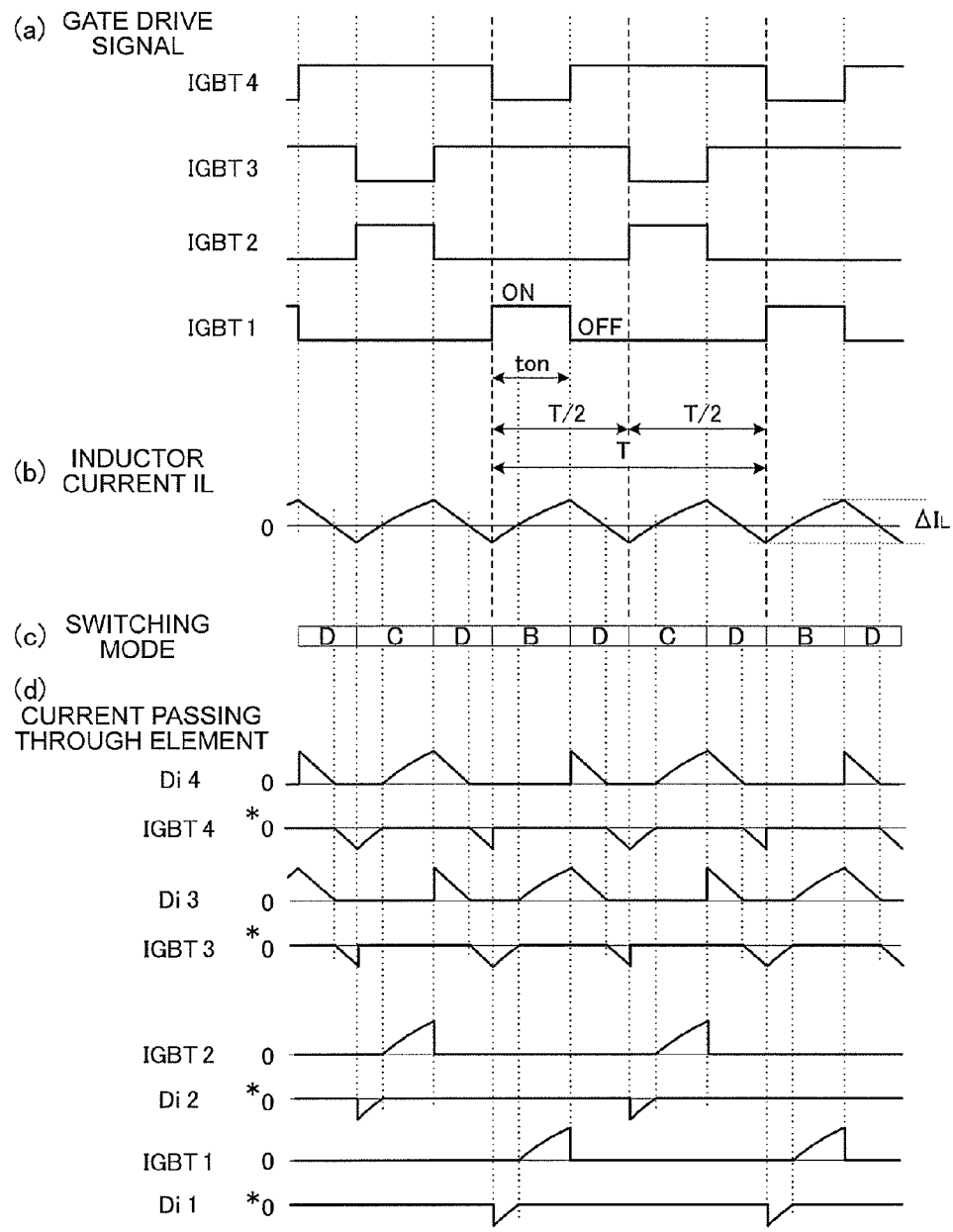
FIG. 13 is a waveform diagram showing an operation in which the inductor current switches between the positive and negative polarities across zero according to the first embodiment of the present invention.

Referring to FIGS. 12 and 13, a description is now given of the switching timing of the switch elements, the inductor conduction current waveform, the conduction current waveforms of the switch elements and the rectifier elements, and the loss.

FIGS. 12 and 13 show a step-up operation in which electric power is supplied from the primary side to the secondary side at an ON-duty cycle of less than 50%.

FIG. 12 shows the operation waveforms when load electric power of the DC/DC voltage converter is so large that the polarity of the inductor current IL remains positive. In FIG. 12, part (a) shows the gate drive signal, part (b) shows the inductor current IL, part (c) shows the switching mode and the switching timing thereof, and part (d) shows the currents flowing through the switch elements and the rectifier elements.

In the operation at the ON-duty cycle of less than 50%, the switching mode is switched in the order of B, D, C, D, and B in a cyclic manner as described above.

First, in the switching mode D, the IGBT3 and the IGBT4 are turned ON and the IGBT1 and the IGBT2 are turned OFF, and a current flows in a path from the positive terminal P1 to the inductor L, the PiN diode Di3, the PiN diode Di4, the positive terminal P2, the electrical device 5, and the negative terminal N2 in this order. In other words, the current flows through the PiN diode Di3 and the PiN diode Di4 among the semiconductor elements, and a steady loss occurs in the PiN diode Di3 and the PiN diode Di4 due to the flow of this forward current.

Next, when the switching mode D is switched to the switching mode B, the IGBT1 and the IGBT3 are turned ON and the IGBT2 and the IGBT4 are turned OFF, and a current flows in a path from the positive terminal P1 to the inductor L, the PiN diode Di3, the energy transfer capacitor C0, the IGBT1, and the negative terminal N1 in this order. The current flows through the IGBT1 and the PiN diode Di3 among the semiconductor elements, and a steady loss occurs in the IGBT1 and the PiN diode Di3 due to the flow of this forward current. Upon the switching from the switching mode D to the switching mode B, the PiN diode Di4 shifts from the conductive state to the non-conductive state.

In this case, the PiN diode Di3 and the PiN diode Di4 are PiN diodes made of Si, which are bipolar elements. In the conductive state in forward bias, holes and electrons both move through the diode in a filled manner as carriers of electric charge. Upon switching to reverse bias, the holes and the electrons start to move in a direction reverse to the moving direction of the forward bias, and hence a current flows in the reverse direction as viewed from outside the diode. This is called "reverse recovery characteristics" of the diode, and the current flowing in the reverse direction is called "recovery current". Holes are lower in carrier mobility than electrons, and hence the recovery current continues to flow for a longer time due to the low carrier mobility of the holes.

Upon the switching from the switching mode D to the switching mode B, the PiN diode Di4 shifts from the conductive state to the non-conductive state, and hence a reverse recovery loss Err caused by the recovery current occurs in the PiN diode Di4 as a switching loss component.

On the other hand, the IGBT1 shifts from the non-conductive state to the conductive state as indicated by a timing m1 of part (d) of FIG. 12. This operation is called "turn-ON". The switching of the IGBT1, and the switching of the IGBT4 and the PiN diode Di4 are complementary operations, and hence a recovery current flows through the PiN diode Di4 at the turn-ON timing of the IGBT1. The recovery current is superimposed on the current of the IGBT1 and therefore affects the amount of the switching loss (turn-ON loss Esw(on)) when the IGBT1 is turned ON.

Subsequently, when the switching mode B is switched to the switching mode D, the IGBT3 and the IGBT4 are turned ON and the IGBT1 and the IGBT2 are turned OFF again, and a current flows through the PiN diode Di3 and the PiN diode Di4 among the semiconductor elements. A steady loss occurs in the PiN diode Di3 and the PiN diode Di4 due to the flow of this forward current.

Upon the switching from the switching mode B to the switching mode D, the IGBT1 shifts from the conductive state to the non-conductive state. This operation is called "turn-OFF", and a turn-OFF loss Esw(off) occurs in this state as a switching loss.

Next, when the switching mode D is switched to the switching mode C, the IGBT2 and the IGBT4 are turned ON and the IGBT1 and the IGBT3 are turned OFF, and a current flows in a path from the positive terminal P1 to the inductor L, the IGBT2, the energy transfer capacitor C0, the PiN diode Di4, the positive terminal P2, the electrical device 5, and the negative terminal N2 in this order.

The current flows through the IGBT2 and the PiN diode Di4 among the semiconductor elements, and a steady loss occurs.

Upon the switching from the switching mode D to the switching mode C, as indicated by a timing m4 of part (d) of FIG. 12, the PiN diode Di3 shifts from the conductive state to the non-conductive state, and hence a reverse recovery loss Err occurs due to a recovery current.

The IGBT2 shifts from the non-conductive state to the conductive state, and a turn-ON loss Esw(on) occurs. The switching of the IGBT2, and the switching of the IGBT3 and the PiN diode Di3 are complementary operations, and hence the recovery current flows through the PiN diode Di3 as described above at the turn-ON timing of the IGBT2.

When the switching mode C is switched to the switching mode D again, a current flows through the PiN diode Di3 and the PiN diode Di4 among the semiconductor elements, and a steady loss occurs as described above.

Upon the switching from the switching mode C to the switching mode D, the IGBT2 shifts from the conductive state to the non-conductive state, and a turn-OFF loss Esw(off) occurs.

The above description is summarized for the loss in the IGBT1 and the IGBT2 and the loss in the PiN diode Di3 and the PiN diode Di4.

In the IGBT1, three loss components are generated, specifically, the turn-ON loss Esw(on) upon the switching to the switching mode B, the steady loss in the period of the switching mode B during which the same amount of current as the inductor current IL flows, and the turn-OFF loss Esw(off) upon the switching from the switching mode B.

Similarly, in the IGBT2, three loss components of the turn-ON loss Esw(on), the steady loss, and the turn-OFF loss Esw(off) similar to those in the IGBT1 are generated in the switching mode C.

In the PiN diode Di3, a current starts to flow at a timing m3 of part (d) of FIG. 12, and the current is interrupted at the timing m4 after the switching mode D, the switching mode B, and the switching mode D. In the periods of those switching modes, the steady loss occurs because the same amount of current as the inductor current IL flows. At the timing m4, the reverse recovery loss Err also occurs due to the recovery current.

Similarly, in the PiN diode Di4, a current whose waveform is similar to that of the PiN diode Di3 flows in the periods of the switching mode D, the switching mode C, and the switching mode D. As the losses, the steady loss and the reverse recovery loss Err occur.

Next, FIG. 13 shows the operation waveforms when load electric power of the DC/DC voltage converter is so small that the polarity of the inductor current IL switches between positive and negative across zero. In FIG. 12, part (a) shows the gate drive signal, part (b) shows the inductor current IL, part (c) shows the switching mode and the switching timing thereof, and part (d) shows the currents flowing through the switch elements and the rectifier elements.

In the operation at the ON-duty cycle of less than 50%, the switching mode is switched in the order of B, D, C, D, and B in a cyclic manner as described above.

First, in the switching mode D, the IGBT3 and the IGBT4 are turned ON and the IGBT1 and the IGBT2 are turned OFF, and after switching to the switching mode D, a current flows in a path from the positive terminal P1 to the inductor L, the PiN diode Di3, the PiN diode Di4, the positive terminal P2, the electrical device 5, and the negative terminal N2 in this order and the inductor current IL attenuates toward zero.

The current flows through the PiN diode Di3 and the PiN diode Di4 among the semiconductor elements, and a steady loss occurs.

When the inductor current IL crosses zero to be negative, a current flows in a path from the negative terminal N2 to the electrical device 5, the positive terminal P2, the IGBT4, the IGBT3, the inductor L, and the positive terminal P1 in this order, and the inductor current IL increases in the negative direction.

The current flows through the IGBT3 and the IGBT4 among the semiconductor elements, and a steady loss occurs. The IGBT3 and the IGBT4 are turned ON when the inductor current IL becomes zero, and hence the turn-ON loss Esw (on), which occurs when the IGBT shifts from the non-conductive state to the conductive state, does not occur (see parts (a) and (d) of FIG. 13; the same applies below).

Next, when the switching mode D is switched to the switching mode B in the state in which the polarity of the inductor current IL is negative, the IGBT1 and the IGBT3 are turned ON and the IGBT2 and the IGBT3 are turned OFF, and a current flows in a path from the negative terminal N1 to the PiN diode Di1, the energy transfer capacitor C0, the IGBT3, the inductor L, and the positive terminal P1 in this order while attenuating toward zero.

The current flows through the PiN diode Di1 and the IGBT3 among the semiconductor elements, and a steady loss occurs.

When the inductor current IL crosses zero to be positive, a current flows in a path from the positive terminal P1 to the inductor L, the PiN diode Di3, the energy transfer capacitor C0, the IGBT1, and the negative terminal N1 in this order, and the inductor current IL increases in the positive direction.

The current flows through the IGBT1 and the PiN diode Di3 among the semiconductor elements, and a steady loss occurs.

The IGBT1 is turned ON when the inductor current IL becomes zero, and hence no turn-ON loss Esw(on) occurs.

Upon the switching from the switching mode D to the switching mode B, the IGBT4 shifts from the conductive state to the non-conductive state, and a turn-OFF loss Esw(off) occurs.

Subsequently, when the switching mode B is switched to the switching mode D in the state in which the polarity of the inductor current IL is positive, the IGBT3 and the IGBT4 are turned ON and the IGBT1 and the IGBT2 are turned OFF again. Then, a current flows through the PiN diode Di3 and the PiN diode Di4 among the semiconductor elements, and a steady loss occurs. The inductor current IL attenuates toward zero.

When the inductor current IL crosses zero to be negative, a current flows in a path from the negative terminal N2 to the electrical device 5, the positive terminal P2, the IGBT4, the IGBT3, the inductor L, and the positive terminal P1 in this order, and the inductor current IL increases in the negative direction.

The current flows through the IGBT3 and the IGBT4 among the semiconductor elements, and a steady loss occurs. The IGBT3 and the IGBT4 are turned ON when the inductor current IL becomes zero, and hence the turn-ON loss Esw(on), which occurs when the IGBT shifts from the non-conductive state to the conductive state, does not occur.

Upon the switching from the switching mode B to the switching mode D, the IGBT1 shifts from the conductive state to the non-conductive state, and a turn-OFF loss Esw(off) occurs.

Next, when the switching mode D is switched to the switching mode C in the state in which the polarity of the inductor current IL is negative, the IGBT2 and the IGBT4 are turned ON and the IGBT1 and the IGBT3 are turned OFF, and a current flows in a path from the negative terminal N2 to the electrical device 5, the positive terminal P2, the IGBT4, the energy transfer capacitor C0, the PiN diode Di2, the inductor L, and the positive terminal P1 in this order while attenuating toward zero.

The current flows through the IGBT4 and the PiN diode Di2 among the semiconductor elements, and a steady loss occurs.

The IGBT4 is turned OFF when the inductor current IL attenuates from the negative state to cross zero, and hence no turn-OFF loss Esw(off) occurs in the IGBT4.

When the inductor current IL crosses zero to be positive, a current flows in a path from the positive terminal P1 to the inductor L, the IGBT2, the energy transfer capacitor C0, the PiN diode Di4, the positive terminal P2, the electrical device 5, and the negative terminal N2 in this order, and the inductor current IL increases in the positive direction.

The current flows through the IGBT2 and the PiN diode Di4 among the semiconductor elements, and a steady loss occurs.

The IGBT2 is turned ON when the inductor current IL becomes zero, and hence no turn-ON loss Esw(on) occurs in the IGBT2.

Upon the switching from the switching mode D to the switching mode C, the IGBT3 shifts from the conductive state to the non-conductive state, and a turn-OFF loss Esw(off) occurs.

Subsequently, when the switching mode C is switched to the switching mode D in the state in which the polarity of the inductor current IL is positive, as described above, a current flows through the PiN diode Di3 and the PiN diode Di4 and a steady loss occurs. The inductor current IL attenuates toward zero.

When the inductor current IL crosses zero to be negative and increases in the negative direction, a current flows through the IGBT3 and the IGBT4, and a steady loss occurs.

The IGBT3 and the IGBT4 are turned ON when the inductor current IL becomes zero, and hence no turn-ON loss Esw(on) occurs.

Upon the switching from the switching mode C to the switching mode D, the IGBT2 shifts from the conductive state to the non-conductive state, and a turn-OFF loss Esw(off) occurs.

The above description is summarized for the loss in the IGBT1, the IGBT2, the IGBT3, and the IGBT4 and the loss in the PiN diodes Di1, Di2, Di3, and Di4.

In the IGBT1, two components are generated, specifically, the steady loss in the period of the switching mode B during which the polarity of the inductor current IL is positive and the same amount of current as the inductor current IL flows, and the turn-OFF loss Esw(off) upon the switching from the switching mode B.

Similarly, in the IGBT2, two loss components are generated in the switching mode C, specifically, the steady loss and the turn-OFF loss Esw(off) similar to those in the IGBT1.

In the IGBT3, the steady loss occurs in the period during which the polarity of the inductor current IL is negative in the switching mode D and in the period during which the polarity of the inductor current IL is negative in the switching mode B. The turn-OFF loss Esw(off) occurs upon the switching from the switching mode D to the switching mode C.

In the IGBT4, the steady loss occurs in the period during which the polarity of the inductor current IL is negative in the switching mode D and in the period during which the polarity of the inductor current IL is negative in the switching mode C. The turn-OFF loss Esw(off) occurs upon the switching from the switching mode D to the switching mode B.

In the PiN diode Di1, the steady loss occurs in the period during which the polarity of the inductor current IL is negative in the switching mode B.

Similarly, in the PiN diode Di2, the steady loss occurs in the period during which the polarity of the inductor current IL is negative in the switching mode C.

In the PiN diode Di3, the steady loss occurs in the period during which the polarity of the inductor current IL is positive in the switching mode D and in the period during which the polarity of the inductor current IL is positive in the switching mode B.

In the PiN diode Di4, the steady loss occurs in the period during which the polarity of the inductor current IL is positive in the switching mode D and in the period during which the polarity of the inductor current IL is positive in the switching mode C.

From the above description, when the polarity of the inductor current IL remains positive, the three loss components of the turn-ON loss Esw(on), the steady loss, and the turn-OFF loss Esw(off) are generated in the IGBT, and the two loss components of the steady loss and the reverse recovery loss Err are generated in the PiN diode Di.

On the other hand, when the polarity of the inductor current IL switches between positive and negative across zero, the two loss components of the steady loss and the turn-OFF loss Esw(off) are generated in the IGBT, and only the steady loss is generated in the PiN diode Di.

There is therefore a difference between the state in which the polarity of the inductor current IL remains positive and the state in which the polarity of the inductor current IL switches between positive and negative across zero in whether or not the turn-ON loss Esw(on) occurs in the IGBT and whether or not the reverse recovery loss Err occurs in the PiN diode Di.

The loss amount therefore differs in the IGBT and the PiN diode Di between the state in which the polarity of the inductor current IL switches between positive and negative across zero and the state in which the polarity of the inductor current IL remains one of positive and negative. Consequently, in the DC/DC voltage converter as a whole, transient voltage fluctuations (deterioration in DC/DC voltage conversion performance) occur due to a discontinuous power loss of the power semiconductor unit of the voltage converter. Whether or not the polarity of the inductor current IL switches depends on the load amount of the DC/DC voltage converter and hence the polarity changes in various ways. Thus, it is a problem if this causes transient voltage fluctuations frequently.

In order to solve this problem, in the DC/DC voltage converter according to the present invention, the control unit 3 switches the switch-ON circuit of the gate drive section 12 depending on the magnitude of the inductor current IL. Specifically, the switch-ON circuit (2) is used under such a load amount that the polarity of the inductor current IL switches between positive and negative across zero, and the switch-ON circuit (1) is used under such a load amount that the polarity of the inductor current IL remains one of positive and negative.

Figure 14:
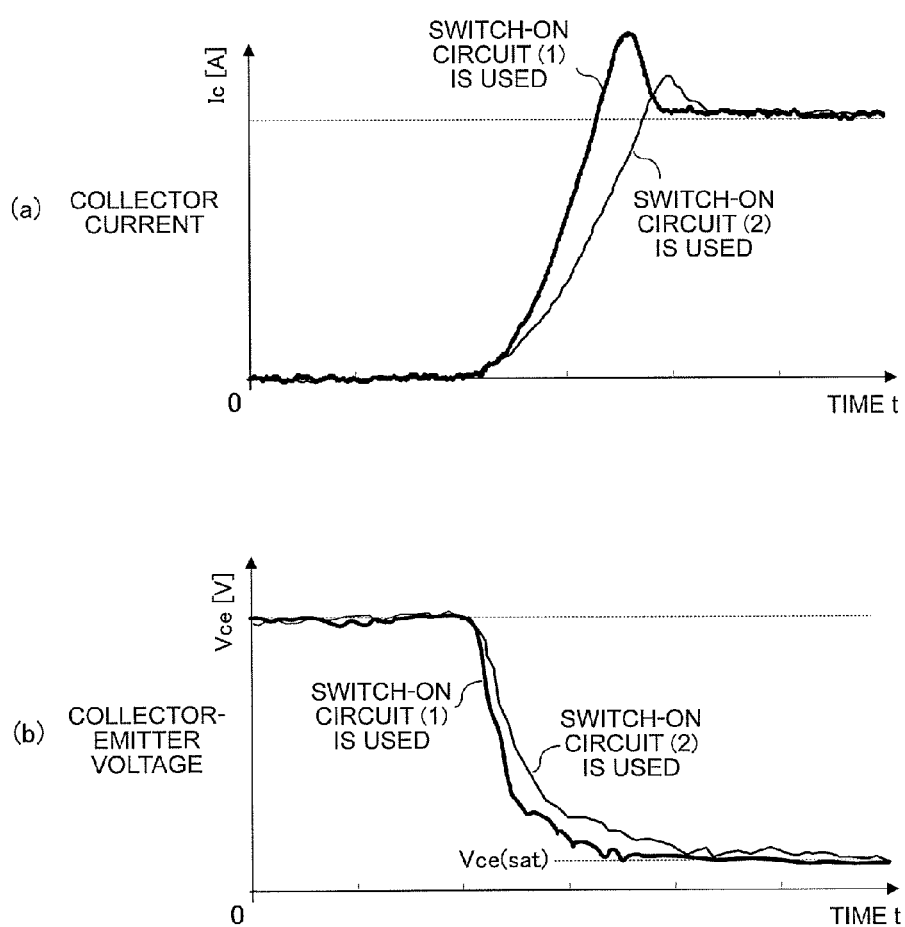
FIG. 14 is a waveform diagram showing a turn-ON operation of an IGBT according to the first embodiment of the present invention.

FIG. 14 shows respective turn-ON waveforms of the IGBT for the switch-ON circuit (1) and the switch-ON circuit (2). Part (a) of FIG. 14 shows a collector current waveform when the IGBT is turned ON, and part (b) of FIG. 14 shows a collector-emitter voltage waveform when the IGBT is turned ON.

In part (a) of FIG. 14, when the switch-ON circuit (1) is used to turn ON the IGBT, the collector current rises quickly at a high current gradient di/dt with an overshoot. When the switch-ON circuit (2) is used to turn ON the IGBT, the collector current rises slowly at a low current gradient di/dt with a smaller overshoot amount as compared to the case of using the switch-ON circuit (1).

Referring to part (b) of FIG. 14, when the switch-ON circuit (1) is used to turn ON the IGBT, the collector-emitter voltage decreases quickly to reach a saturation voltage Vce (sat). When the switch-ON circuit (2) is used to turn ON the IGBT, the collector-emitter voltage decreases more slowly over time to reach the saturation voltage Vce(sat) as compared to the case of using the switch-ON circuit (1).

The turn-ON loss of the IGBT is the product of a rising current amount of the collector current and a falling current amount of the collector-emitter voltage, and hence a turn-ON loss Esw(on)1 that occurs when the switch-ON circuit (1) is used is smaller than a turn-ON loss Esw(on)2 that occurs when the switch-ON circuit (2) is used.

The details of the above-mentioned operation of the control unit 3 for switching between the switch-ON circuit (1) and the switch-ON circuit (2) described below.

Figure 9:
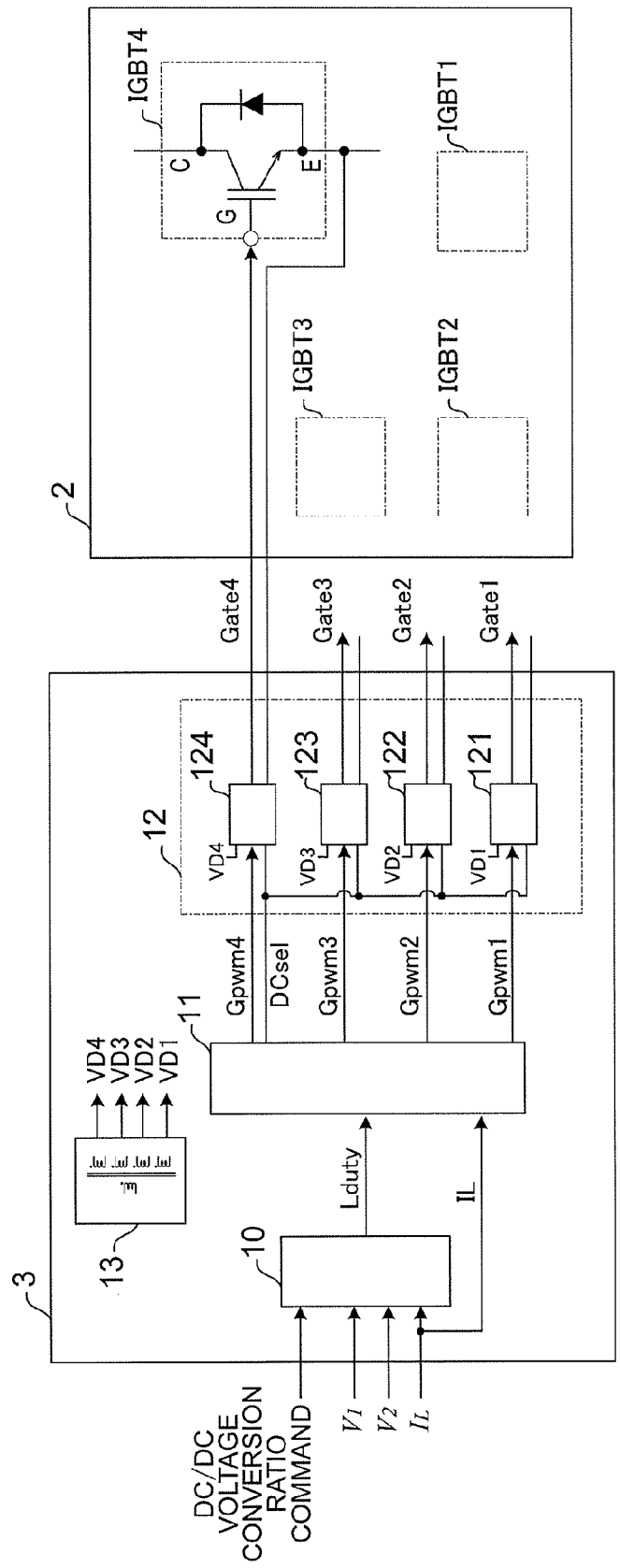
FIG. 9 is a block diagram illustrating configurations of a control unit and the converter main circuit according to the first embodiment of the present invention.

Referring to FIG. 9, the conversion control section 10 of the control unit 3 performs the negative feedback operation of the voltage conversion ratio and outputs the target amount Lduty of the ON-duty cycles of the IGBT1 and the IGBT2.

Subsequently, the gate PWM generating section 11 inputs Lduty and performs pulse width modulation. The gate PWM generating section 11 further generates the gate PWM signals Gpwm1, Gpwm2, Gpwm3, and Gpwm4 and outputs those gate PWM signals to the gate drive section 12.

The gate PWM generating section 11 uses the value of the inductor current IL to output a switching signal DCsel for determining which of the switch-ON circuit (1) and the switch-ON circuit (2) is to be selected to the gate drive section 12.

Figure 10:
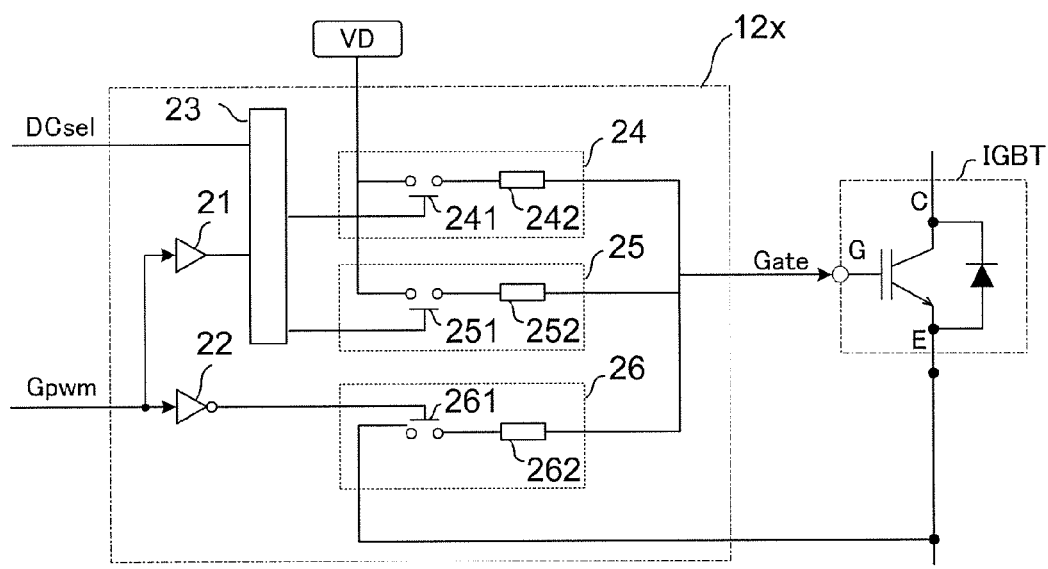
FIG. 10 is a block diagram illustrating a detailed configuration of a gate drive section according to the first embodiment of the present invention.

The detailed configuration of the gate drive section 12 is illustrated in FIG. 10.

FIG. 10 illustrates a gate drive circuit 12x as a representative of the four individual gate drive circuits 121, 122, 123, and 124 included in the gate drive section 12. The individual gate drive circuits 121, 122, 123, and 124 have the same configuration and operation. The gate drive circuit 121 corresponds to the IGBT1; 122, the IGBT2; 123, the IGBT3; and 124, the IGBT4.

The gate drive circuit 12x operates any one of a switch-ON circuit (1) 24, a switch-ON circuit (2) 25, and a switch-OFF circuit 26 to generate and output the gate drive signal 8.

The switch-ON circuit (1) 24 is formed of a semiconductor switch 241 such as a small-signal field effect transistor and a circuit resistor 242. Similarly, the switch-ON circuit (2) 25 is formed of a semiconductor switch 251 and a circuit resistor 252, and the switch-OFF circuit 26 is formed of a semiconductor switch 261 and a circuit resistor 262. In this case, the relationship of "(resistance value of circuit resistor 242)< (resistance value of circuit resistor 252)" is established.

When the gate PWM signal Gpwm is input to the gate drive circuit 12x, the gate PWM signal Gpwm is transmitted inside to a signal buffer 21 and a signal buffer (inverter) 22. The signal buffer 21 is an amplifier circuit for controlling the semiconductor switches 241 and 251 to be closed when the logic of the gate PWM signal Gpwm is the logic of switch-ON and be open when the logic of the gate PWM signal Gpwm is the logic of switch-OFF.

When the logic of Gpwm is switch-ON, any one of the semiconductor switch 241 and the semiconductor switch 251 is closed so that the voltage of the gate drive signal 8 (Gate) becomes the power supply voltage VD. Consequently, the corresponding IGBT in the converter main circuit 2 is switched ON.

When the logic of Gpwm is switch-OFF, the semiconductor switch 261 is closed so that the voltage of the gate drive signal 8 (Gate) becomes equal to the emitter potential. Consequently, the corresponding IGBT in the converter main circuit 2 is switched OFF.

In this case, which of the semiconductor switch 241 and the semiconductor switch 251 is to be closed is selected by a circuit switch 23.

The output of the signal buffer 21 and the switching signal DCsel are input to the circuit switch 23. The circuit switch 23 selects which of the switch-ON circuit (1) 24 and the switch-ON circuit (2) 25 is to be operated, and transmits a control signal to close the semiconductor switch in the selected switch-ON circuit.

Figure 11:
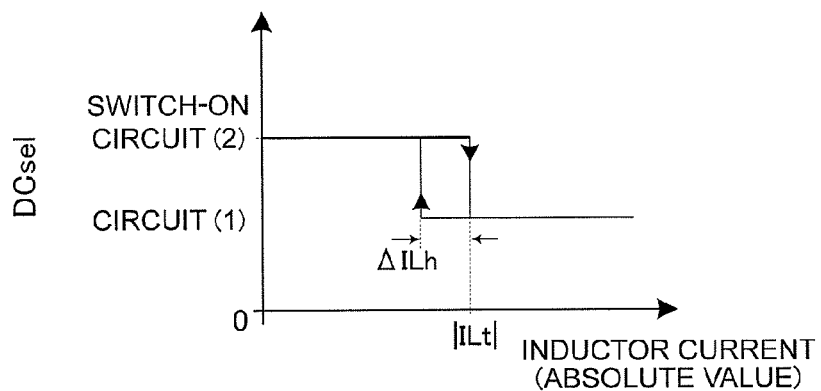
FIG. 11 is a graph showing a method of selecting a switch-ON circuit according to the first embodiment of the present invention.

The selection of the switch-ON circuit by the circuit switch 23 is performed in the manner shown in FIG. 11.

FIG. 11 is an explanatory diagram schematically showing which of the switch-ON circuits is to be selected in accordance with the inductor current IL (absolute value). In FIG. 11, the switch-ON circuit is switched with a hysteresis of a width $\Delta$ILh with respect to the inductor current IL.

Specifically, when the absolute value of the inductor current becomes equal to or larger than |ILt| A in the state in which the switch-ON circuit (2) 25 is selected, the switching is performed to select the switch-ON circuit (1) 24. When the absolute value of the inductor current becomes smaller than (|ILt|−$\Delta$ILh) A in the state in which the switch-ON circuit (1) 24 is selected, on the other hand, the switching is performed to select the switch-ON circuit (2) 25.

Specifically, the circuit switch 23 causes the switch-ON circuit (1) 24 having a lower circuit resistance value to operate when the absolute value of the inductor current increases to be equal to or larger than the first threshold |ILt| A, and causes the switch-ON circuit (2) 25 having a higher circuit resistance value to operate when the absolute value of the inductor current decreases to be smaller than the threshold (|ILt|−ΔILh) A.

In the switch-ON circuit (1) 24, the rate of charging electric charge of the gate of the IGBT is high. In the switch-ON circuit (2) 25, the rate of charging electric charge of the gate of the IGBT is low. Consequently, the current and voltage waveforms of the turned-ON IGBT are those shown in FIG. 14.

Through the above-mentioned operation, the control unit 3 switches the switch-ON circuit in the turn-ON operation of the IGBT4 to IGBT1 based on the magnitude relationship with the threshold of the inductor current IL, and outputs the gate drive signals Gate1 to Gate4. In this case, the switching of the switch-ON circuit in the turn-ON operation acts to suppress the transient voltage fluctuations, which occur when the power loss of the power semiconductor unit of the DC/DC voltage converter becomes discontinuous as a whole because the loss amounts generated in the IGBT and the PiN diode Di differ between the state in which the polarity of the inductor current IL switches between positive and negative across zero and the state in which the polarity of the inductor current IL remains one of positive and negative.

Figure 15:
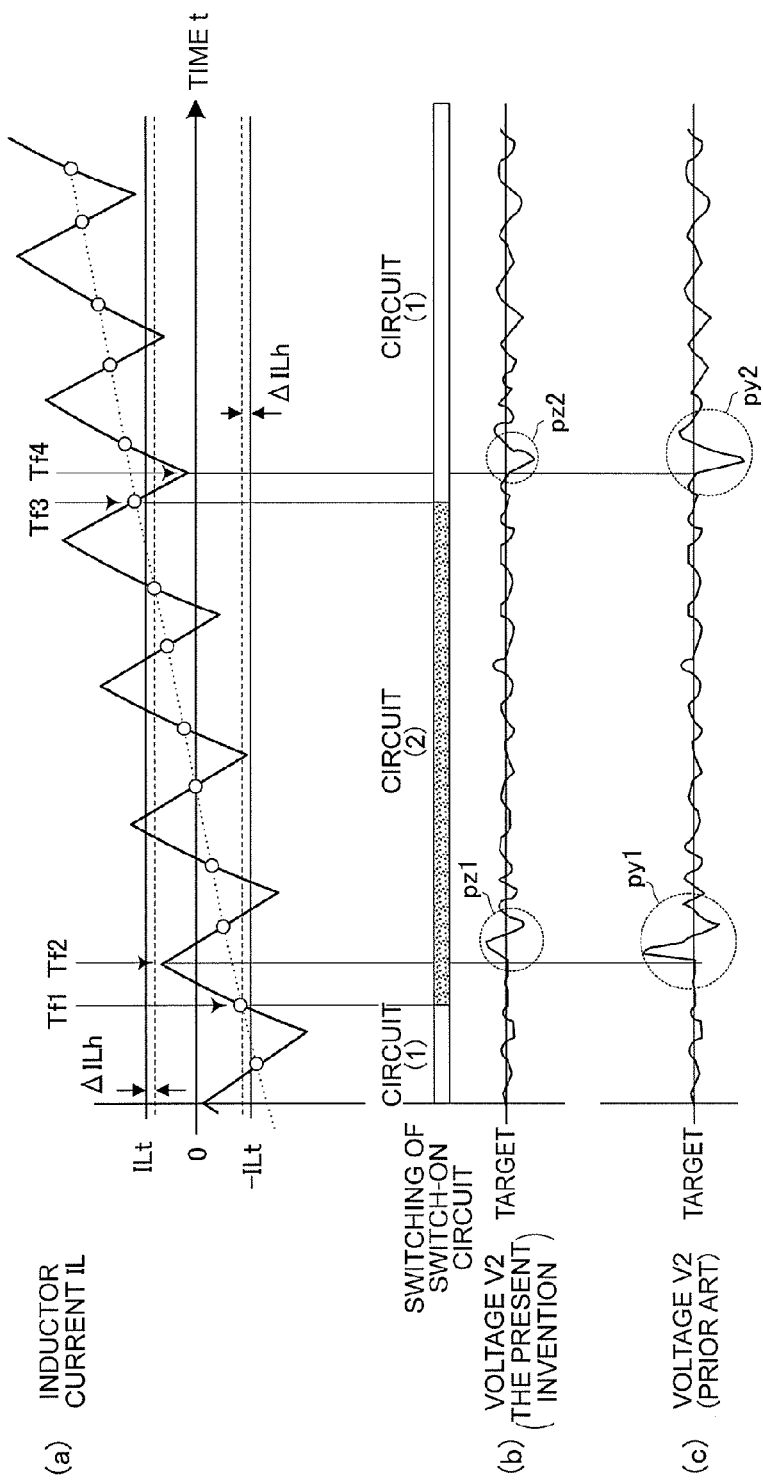
FIG. 15 is a waveform diagram showing an operation of switching the switch-ON circuit according to the first embodiment of the present invention.

The details are described with reference to FIG. 15. Part (a) of FIG. 15 shows the inductor current IL and the switching of the switch-ON circuit. Part (b) of FIG. 15 shows a temporal waveform of the secondary-side terminal voltage V2 of the DC/DC voltage converter that operates in this embodiment. Part (c) of FIG. 15 shows a temporal waveform of the secondary-side terminal voltage V2 of the conventional DC/DC voltage converter. FIG. 15 shows the case where the inductor current IL increases from negative to positive in response to the fluctuations in load amount of the DC/DC voltage converter.

In part (c) of FIG. 15, the waveform of the secondary-side terminal voltage V2 of the conventional DC/DC voltage converter is disturbed as indicated by a point py1 at a timing Tf2 at which the inductor current IL starts to change toward zero after shifting to the positive polarity from the negative polarity across zero. The voltage waveform is also disturbed as indicated by a point py2 at a timing Tf4 at which the inductor current IL no longer crosses zero even with ripple after increasing further in the positive direction.

On the other hand, the secondary-side terminal voltage V2 of the DC/DC voltage converter that operates in this embodiment is shown in part (b) of FIG. 15.

The inductor current IL of part (a) of FIG. 15 is sampled by a microprocessor, an electronic circuit, or the like (not shown) at intermediate timings between the switching modes (indicated by circles in the current waveform), and is input to the control unit 3 and used for the determination of switching between the switch-ON circuit (1) and the switch-ON circuit (2).

The switching is performed under such determination conditions as shown in FIG. 11 that the switch-ON circuit (1) is switched to the switch-ON circuit (2) at a timing Tf1.

Subsequently, when the inductor current IL increases further in the positive direction, the switch-ON circuit (2) is switched to the switch-ON circuit (1) at a timing Tf3.

Through this operation, the disturbance of the voltage waveform at the timing Tf2 is suppressed to the level indicated by a point pz1. Similarly, the disturbance of the voltage waveform at the timing Tf4 is suppressed to the level indicated by a point pz2.

As described above, according to this embodiment, the transient voltage fluctuations can be reduced, which occur when the loss amounts generated in the IGBT and the PiN diode Di differ between the state in which the polarity of the inductor current IL switches between positive and negative across zero and the state in which the polarity of the inductor current IL remains one of positive and negative.

Second Embodiment

Figure 16:
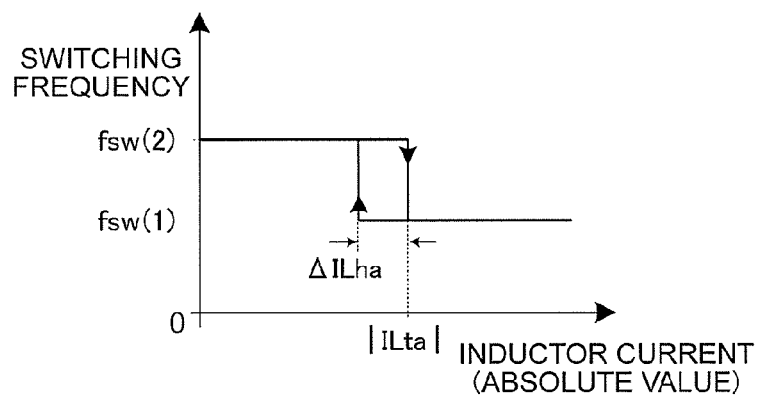
FIG. 16 is a graph showing a method of selecting a switching frequency according to a second embodiment of the present invention.
Figure 17:
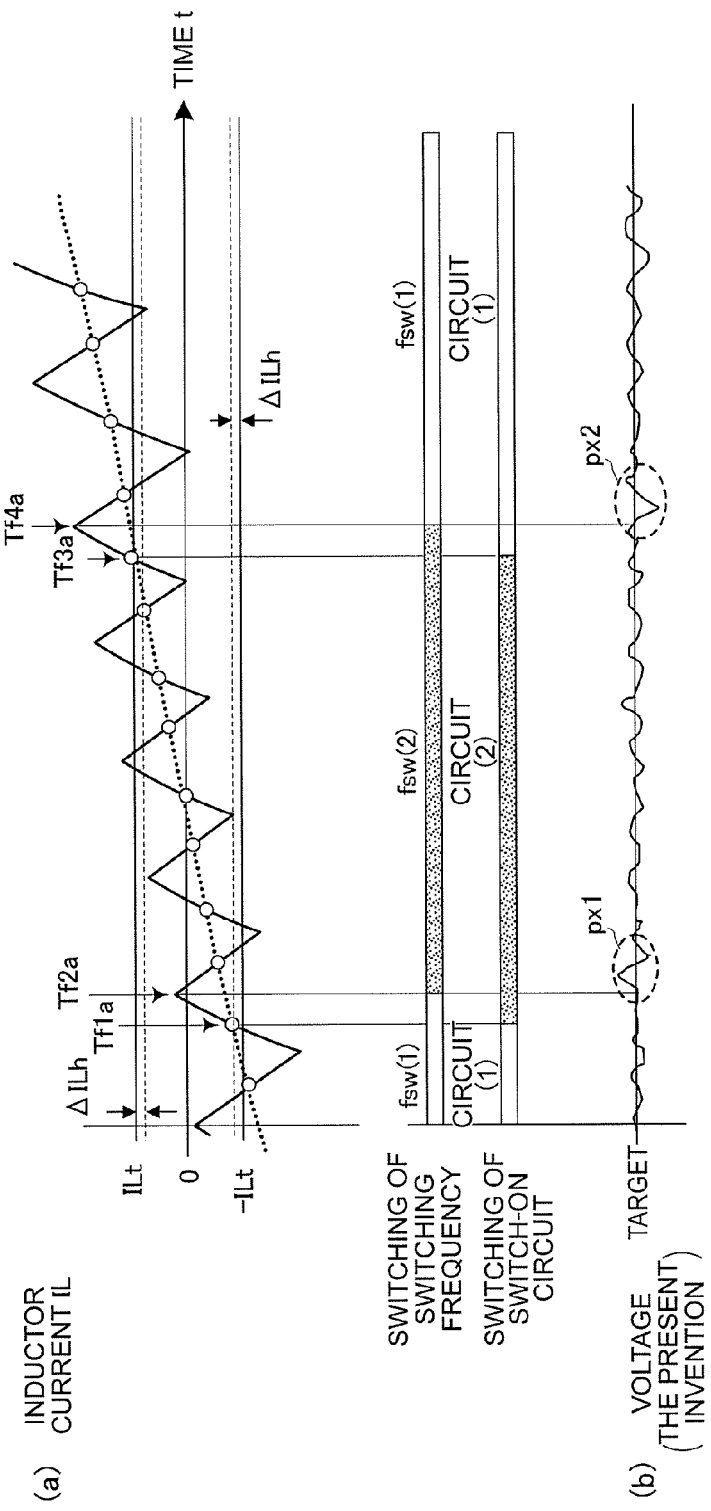
FIG. 17 is a waveform diagram showing an operation of switching the switch-ON circuit and an operation of switching the switching frequency according to the second embodiment of the present invention.

Referring to FIGS. 16 and 17, a DC/DC voltage converter according to a second embodiment of the present invention is now described.

The DC/DC voltage converter according to the second embodiment of the present invention has the same configuration, operation, and function as those of the DC/DC voltage converter according to the above-mentioned first embodiment, except for the operation of the gate PWM generating section 11 of the control unit 3. Descriptions of the same configuration, operation, and function as those in the first embodiment are hereinafter omitted as appropriate.

First, FIG. 16 is an explanatory diagram schematically showing the relationship between the inductor current IL and the switching of the switching frequency according to the second embodiment of the present invention.

In FIG. 16, the switching frequency is switched with a hysteresis of a width ΔILha with respect to the inductor current IL.

Specifically, when the absolute value of the inductor current becomes equal to or larger than |ILta| A in the state in which a switching frequency fsw(2) is selected, the switching frequency is switched so that the gate PWM generating section 11 may operate at a switching frequency fsw(1). When the absolute value of the inductor current becomes smaller than (|ILta|−ΔILha) A in the state in which the switching frequency fsw(1) is selected, on the other hand, the switching frequency is switched so that the gate PWM generating section 11 may operate at the switching frequency fsw(2).

In this case, the switching frequency fsw has a relationship of fsw(2)>fsw(1), where the switching frequency fsw(2) is higher.

Specifically, the gate PWM generating section 11 generates and outputs a gate PWM signal at the lower switching frequency fsw(1) when the absolute value of the inductor current increases to be equal to or larger than |ILta| A, and generates and outputs a gate PWM signal at the switching frequency fsw(2) higher than the switching frequency fsw(1) when the absolute value of the inductor current deceases to be smaller than (|ILta|−ΔILha) A.

As the switching frequency becomes higher, the number of switching operations per unit time becomes larger to increase the losses in both of the switch element and the rectifier element.

As described in the first embodiment, on the other hand, there is a difference between the state in which the polarity of the inductor current IL remains positive and the state in which the polarity of the inductor current IL switches between positive and negative across zero in whether or not the turn-ON loss Esw(on) occurs in the IGBT and whether or not the reverse recovery loss Err occurs in the PiN diode Di, with the result that the loss amount differs in the IGBT and the PiN diode Di. The power loss of the power semiconductor unit therefore becomes discontinuous.

In this embodiment, the switching frequency is switched in addition to the switching operation of the switch-ON circuit described in the first embodiment, to thereby suppress a discontinuous power loss of the power semiconductor unit more reliably and prevent the occurrence of transient voltage fluctuations.

The details are described with reference to FIG. 17. Part (a) of FIG. 17 shows the inductor current IL, the switching of the switching frequency, and the switching of the switch-ON circuit. Part (b) of FIG. 17 shows a temporal waveform of the secondary-side terminal voltage V2 of the DC/DC voltage converter that operates in this embodiment. FIG. 17 shows the case where the inductor current IL increases from negative to positive in response to the fluctuations in load amount of the DC/DC voltage converter.

The inductor current IL of part (a) of FIG. 17 is sampled by a microprocessor, an electronic circuit, or the like (not shown) at timings indicated by circles in the current waveform, and is input to the control unit 3 to be used for the determination of switching between the switch-ON circuit (1) and the switch-ON circuit (2) and the determination of switching between the switching frequency fsw(1) and the switching frequency fsw(2).

In FIG. 17, |ILt| and |ILta| are set to be equal to each other and ΔILh and ΔILha are set to be equal to each other for simple illustration.

The switching of the switching frequency is performed under such determination conditions as shown in FIG. 16 that it is determined to switch the switching frequency to fsw(2) at a timing Tf1a. This switching is reflected as an actual PWM waveform after a timing Tf2a.

Subsequently, when the inductor current IL increases further in the positive direction, it is determined to switch the switching frequency to fsw(1) at a timing Tf3a. This switching is reflected as an actual PWM waveform after a timing Tf4a.

Similarly, the switching between the switch-ON circuit (1) and the switch-ON circuit (2) is performed at the timing Tf1a and the timing Tf3a.

Through the above-mentioned operation, the disturbance of the voltage waveform at the timing Tf2a and the disturbance of the voltage waveform at the timing Tf4a are further reduced as indicated by a point px1 and a point px2, respectively, as compared to the first embodiment shown in part (b) of FIG. 15.

Third Embodiment

Figure 18:
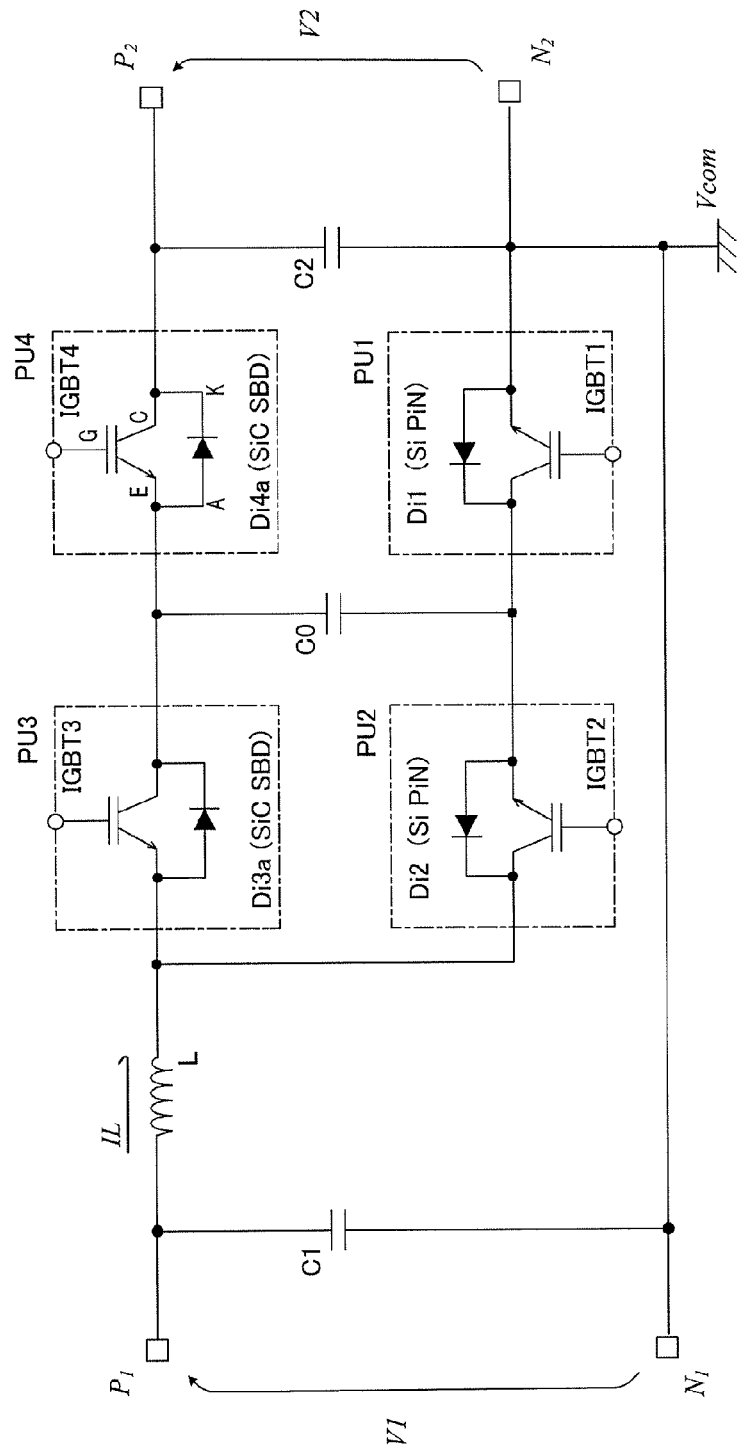
FIG. 18 is a diagram illustrating an example of circuit wiring of a converter main circuit according to a third embodiment of the present invention.
Figure 19:
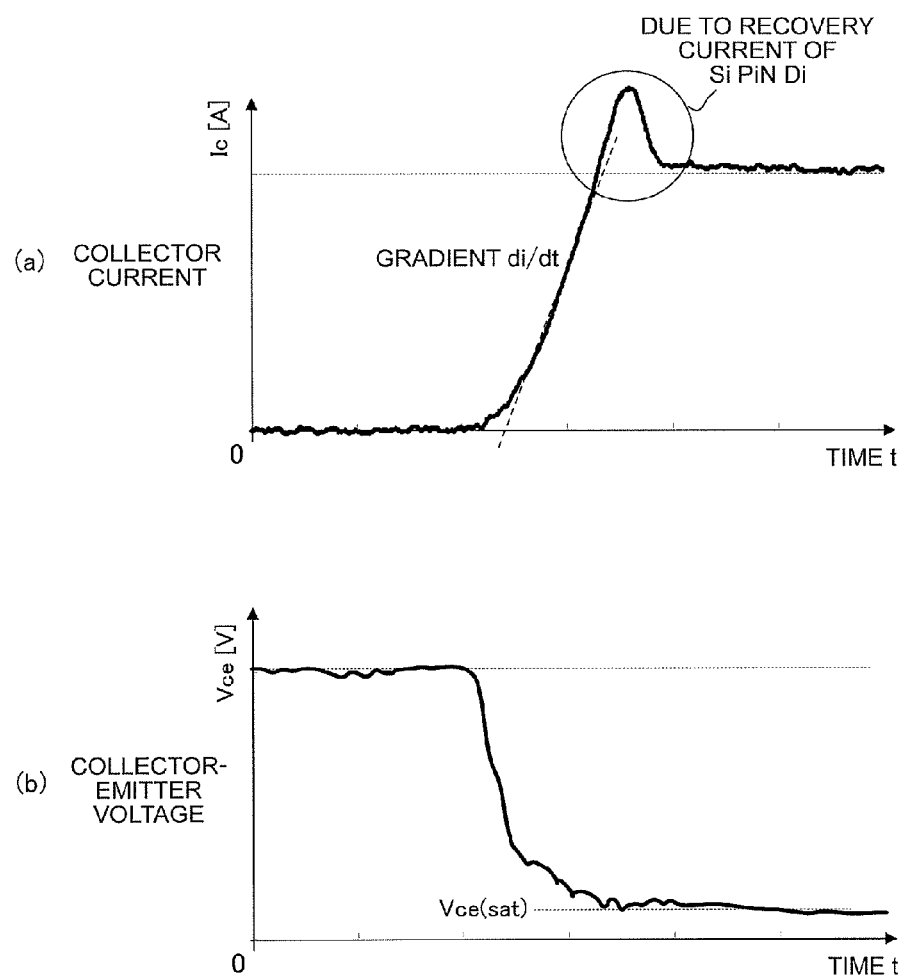
FIG. 19 is a waveform diagram showing the turn-ON operation of the IGBT when a PiN diode is used.
Figure 20:
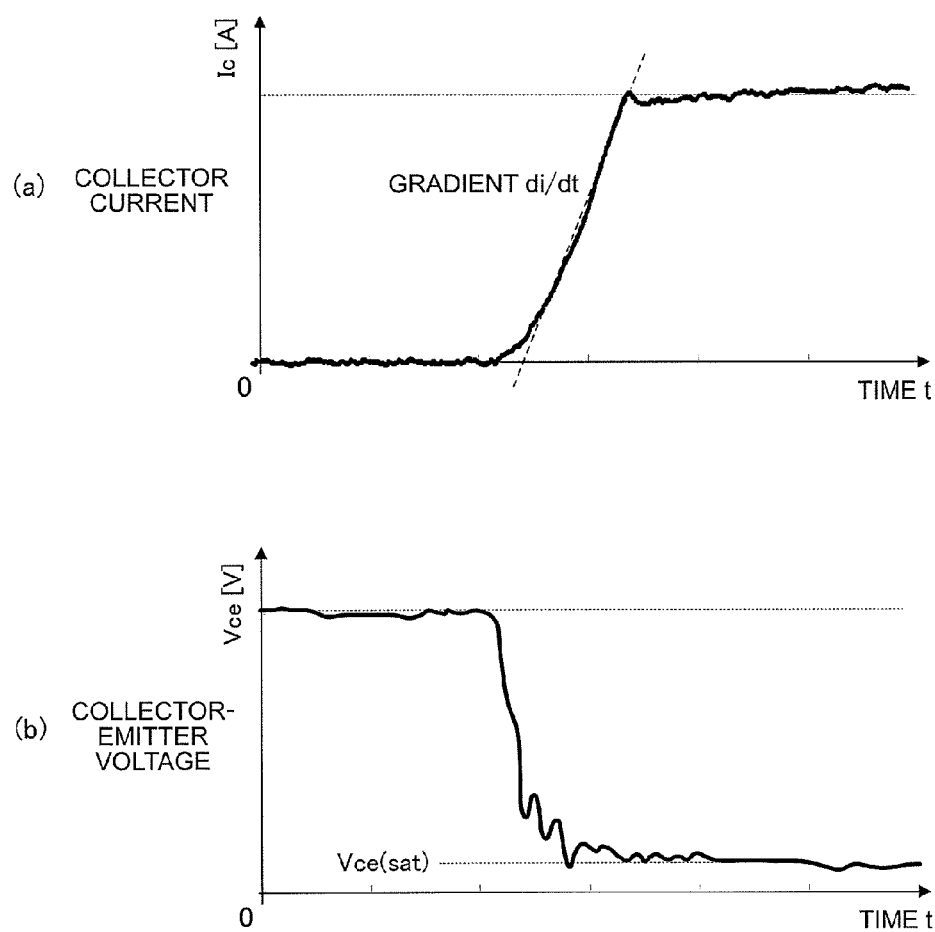
FIG. 20 is a waveform diagram showing the turn-ON operation of the IGBT when a SiC Schottky barrier diode is used according to the third embodiment of the present invention.

Referring to FIGS. 18 to 20, a DC/DC voltage converter according to a third embodiment of the present invention is now described.

In the DC/DC voltage converter according to the third embodiment of the present invention, instead of using a bipolar PiN diode made of Si, a unipolar (unipolar semiconductor) Schottky barrier diode (SBD) made of silicon carbide (SiC) having a larger bandgap is used as diodes Di4a and Di3a as the rectifier elements of the converter main circuit 2.

The DC/DC voltage converter according to the third embodiment of the present invention has the same configuration, operation, and function as those of the DC/DC voltage converter according to the above-mentioned first embodiment, except for the configuration and operation of the converter main circuit 2. Descriptions of the same configuration, operation, and function as those in the first embodiment are hereinafter omitted as appropriate.

Reference is first made to FIG. 18. FIG. 18 illustrates the configuration of the converter main circuit 2 according to this embodiment. Of the rectifier elements of the diodes Di1, Di2, Di3a, and Di4a in the power semiconductor units PU1 to PU4, the diodes Di3a and Di4a closer to the secondary-side positive terminal P2 of the converter main circuit 2 are Schottky barrier diodes made of SiC, and the diodes Di2 and Di1 closer to the secondary-side negative terminal N2 of the converter main circuit 2 are PiN diodes made of Si.

As described in the first embodiment, the IGBT1 and the IGBT4, and the IGBT2 and the IGBT3 are switched with the complementary logics, respectively, and hence, when the IGBT1 is turned ON, a recovery current of the Schottky barrier diode Di4a connected in anti-parallel to the IGBT4 is superimposed on the conduction current of the IGBT1, thereby affecting the amount of the turn-ON loss Esw(on).

When the IGBT2 is turned ON, on the other hand, a recovery current of the Schottky barrier diode Di3a connected in anti-parallel to the IGBT3 is superimposed on the conduction current of the IGBT2, thereby affecting the amount of the turn-ON loss Esw(on).

Referring to FIGS. 19 and 20, a description is now given of how the turn-ON waveform of the IGBT differs between when the Si PiN diodes are used as the diodes and when the SiC Schottky barrier diodes are used as the diodes.

FIG. 19 shows the turn-ON waveform of the IGBT when the Si PiN diode is used. In FIG. 19, part (a) shows a collector current waveform and part (b) shows a collector-emitter voltage waveform.

When the IGBT is turned ON, the collector-emitter voltage decreases to reach a saturation voltage Vce(sat). The collector current rises at a gradient di/dt, and converges to a predetermined value after an overshoot. The overshoot occurs because the recovery current of the complemented Si PiN diode is superimposed.

FIG. 20 shows the turn-ON waveform of the IGBT when the SiC Schottky barrier diode is used. In FIG. 20, part (a) shows a collector current waveform and part (b) shows a collector-emitter voltage waveform.

Similarly to part (b) of FIG. 19, when the IGBT is turned ON, the collector-emitter voltage decreases to reach the saturation voltage Vce(sat). As compared to FIG. 19, the rate of charging electric charge of the gate capacitance for switching ON the IGBT is equal, and hence the collector current rises at the same gradient di/dt as in part (a) of FIG. 19. No overshoot, however, occurs. This is because the SiC Schottky barrier diode is a unipolar rectifier element in which only electrons serve as carriers of electric charge, and hence the recovery current hardly flows when the diode is connected in reverse bias.

When the IGBT is turned ON, the amount of the recovery current of the diode is smaller in the case of using the SiC Schottky barrier diode than in the case of using the Si PiN diode, and the turn-ON loss Esw(on) of the IGBT, which is the product of a rising current amount of the collector current and a falling current amount of the collector-emitter voltage, is reduced.

In the case where the DC/DC voltage converter 1 is incorporated in the electric drive system for a hybrid vehicle or an electric vehicle illustrated in FIG. 24 and a rechargeable secondary battery such as a nickel-hydrogen battery or a lithium-ion battery is applied to the primary-side terminals P1 and N1, the terminal voltage of the battery greatly differs depending on whether the battery is being discharged or charged because of an internal resistance component of the battery even when the current amounts of the same absolute value are output.

Specifically, even when the same secondary battery and the current amounts of the same absolute value are handled, the primary-side terminal voltage differs greatly depending on whether the DC/DC voltage converter 1 is performing a step-up powering operation for supplying electric power from the primary side to the secondary side or a step-down regenerating operation for supplying electric power from the secondary side to the primary side. In the step-up powering operation, the primary-side terminal voltage becomes smaller. In the step-down regenerating operation, the primary-side terminal voltage becomes higher.

Accordingly, when the same secondary voltage and the current amounts of the same absolute value are handled, the step-up ratio V2/V1 is high in the step-up powering operation of the DC/DC voltage converter 1, and the step-up ratio V2/V1 is low in the step-down regenerating operation. Consequently, the primary-side current becomes larger to cause a larger loss in the switch element and the rectifier element in the step-up powering operation with the high step-up ratio V2/V1 than in the step-down regenerating operation with the low step-up ratio V2/V1.

As described above, according to this embodiment, the SiC Schottky barrier diodes are applied to the diodes Di3a and Di4a so as to reduce the turn-ON loss Esw(on) of the IGBT1 and the IGBT2 that are responsible for main switching in the step-up powering operation.

Consequently, the degree of discontinuity of the power loss in the power semiconductor unit depending on the magnitude of the load amount of the DC/DC voltage converter 1 can be suppressed more reliably, and the transient voltage fluctuations caused by the difference in how the polarity of the conduction current IL of the inductor changes can be reduced more.

Further, the losses both in the switch element and in the rectifier element can be reduced to improve the operation efficiency of the DC/DC voltage converter, enhance the output power capacity to be handled, and increase the power density.

Fourth Embodiment

Figure 21:
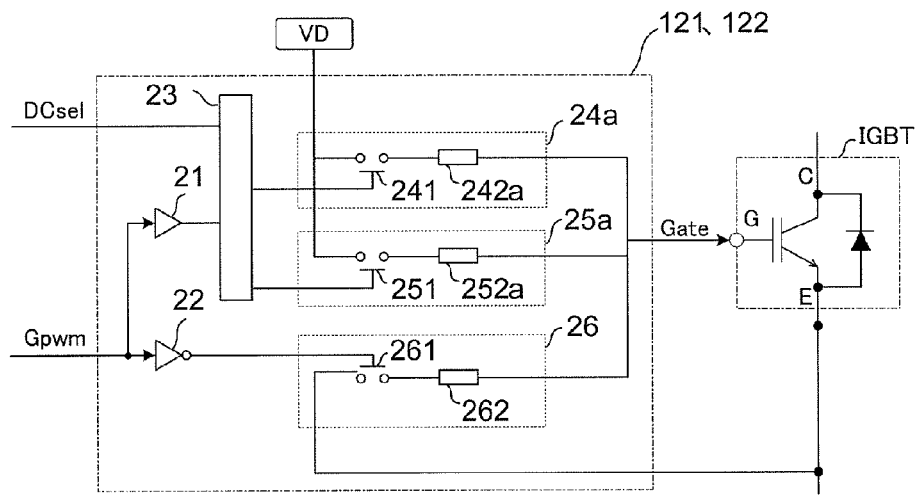
FIG. 21 is a block diagram illustrating a detailed configuration of a gate drive circuit according to a fourth embodiment of the present invention.
Figure 22:
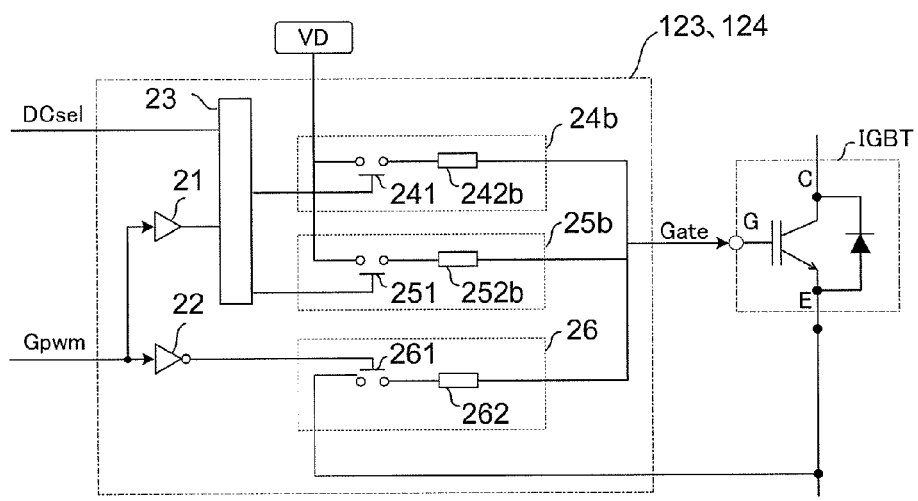
FIG. 22 is a block diagram illustrating a detailed configuration of another gate drive circuit according to the fourth embodiment of the present invention.

Referring to FIGS. 21 and 22, a DC/DC voltage converter according to a fourth embodiment of the present invention is now described.

The DC/DC voltage converter according to the third embodiment of the present invention has the same configuration, operation, and function as those of the DC/DC voltage converter according to the above-mentioned first to third embodiments, except for the configuration and operation of the gate drive section 12 of the control unit 3. Descriptions of the same configuration, operation, and function as those in the first to third embodiments are hereinafter omitted as appropriate. This embodiment uses the converter main circuit 2 illustrated in FIG. 18 described in the third embodiment.

In this embodiment, among the four individual gate drive circuit (1) 121, gate drive circuit (2) 122, gate drive circuit (3) 123, and gate drive circuit (4) 124 constituting the gate drive section 12, the gate drive circuit (1) 121 and the gate drive circuit (2) 122 corresponding to the IGBT1 and the IGBT2 have a configuration illustrated in FIG. 21.

The gate drive circuit (3) 123 and the gate drive circuit (4) 124 corresponding to the IGBT3 and the IGBT4 have a configuration illustrated in FIG. 22.

In the gate drive circuit (1) 121 and the gate drive circuit (2) 122 of FIG. 21, and the gate drive circuit (3) 123 and the gate drive circuit (4) 124 of FIG. 22, circuit resistors 242a, 252a, 242b, and 252b of switch-ON circuits (1) 24a and (1) 24b and switch-ON circuits (2) 25a and (2) 25b have different resistance values with the following relationships:

(resistance value of circuit resistor 242a)<(resistance value of circuit resistor 252a);

(resistance value of circuit resistor 242b)<(resistance value of circuit resistor 252b);

(resistance value of circuit resistor 242b)<(resistance value of circuit resistor 242a); and (resistance value of circuit resistor 252b)<(resistance value of circuit resistor 252a).

Specifically, the circuit resistance values of the switch-ON circuit (1) 24b and the switch-ON circuit (2) 25b of the gate drive circuit (3) 123 and the gate drive circuit (4) 124 are smaller than the circuit resistance values of the switch-ON circuit (1) 24a and the switch-ON circuit (2) 25a of the gate drive circuit (1) 121 and the gate drive circuit (2) 122, respectively, and hence the rate of charging electric charge of the gate capacitance of the IGBT3 and the IGBT4 is higher than the rate of charging electric charge of the gate capacitance of the IGBT1 and the IGBT2.

The configuration of the converter main circuit 2 according to this embodiment is illustrated in FIG. 18. Schottky barrier diodes made of SiC are used for the diodes Di3a and Di4a, and PiN diodes made of Si are used for the diodes Di2 and Di1. Accordingly, the recovery current of the Schottky barrier diodes Di3a and Di4a is extremely small, and hence the turn-ON loss Esw(on) in the IGBT1 and the IGBT2 is hardly increased by the superposition of the recovery current.

On the other hand, a recovery current flows through the PiN diodes Di1 and Di2, which are bipolar elements, and hence the turn-ON loss Esw(on) in the IGBT3 and the IGBT4 is increased by the superposition of the recovery current.

As described above, when the gate drive circuits having the same circuit resistance value are used to turn on the IGBTs, a larger turn-ON loss Esw(on) occurs in the IGBT3 and the IGBT4 than in the IGBT1 and the IGBT2. On the other hand, by setting the circuit resistance values of the gate drive circuits (121 to 124) to have the above-mentioned relationships so as to increase the rate of charging electric charge of the gate capacitance of the IGBT3 and the IGBT4 to be higher than the rate of charging electric charge of the gate capacitance of the IGBT1 and the IGBT2, the collector current rises quickly at a high gradient di/dt, and hence the difference in turn-ON loss Esw(on) with respect to the IGBT3 and the IGBT4 is reduced.

In this manner, even in the case where the diodes Di3 and Di4 are Schottky barrier diodes made of SiC and the diodes Di2 and Di1 are PiN diodes made of Si as exemplified by the configuration of the converter main circuit 2 of FIG. 18, the difference in power loss of the IGBT3 and the IGBT4 with respect to the IGBT1 and the IGBT2 can be reduced, and hence, even if the load amount changes greatly in a short period of time between the step-up powering operation and the step-down regenerating operation, the degree of discontinuity of the power loss in the power semiconductor unit can be suppressed to reduce the transient voltage fluctuations.

Further, the usage of semiconductor made of the SiC material, which is more expensive than the Si material, can be suppressed (the SiC material is used only for the diodes Di3 and Di4) to suppress the increase in cost, and the losses both in the switch element and in the rectifier element can be reduced to improve the operation efficiency of the DC/DC voltage converter, enhance the output power capacity to be handled, and increase the power density.

Fifth Embodiment

Figure 23:
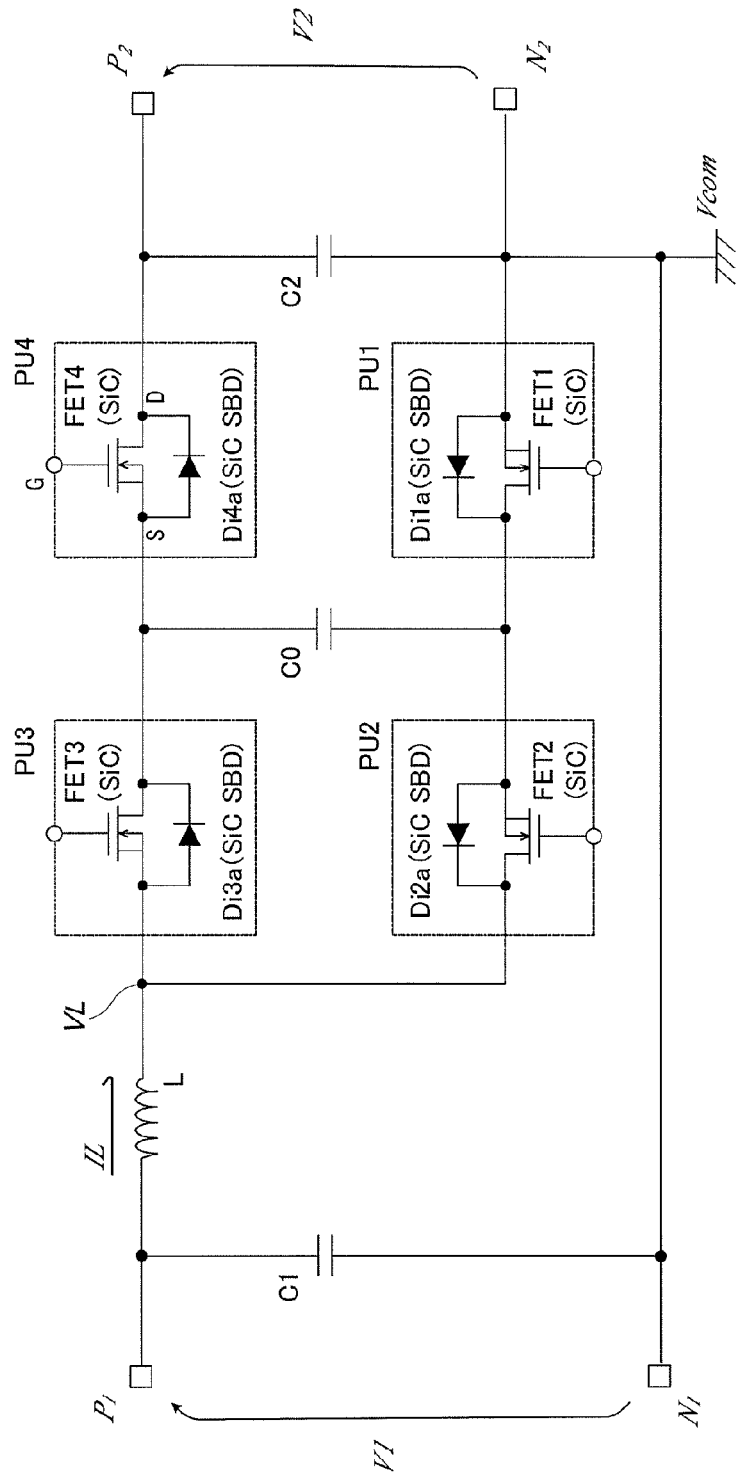
FIG. 23 is a diagram illustrating an example of circuit wiring of a converter main circuit according to a fifth embodiment of the present invention.

Referring to FIG. 23, a DC/DC voltage converter according to a fifth embodiment of the present invention is now described.

The DC/DC voltage converter according to the fifth embodiment has the same configuration, operation, and function as those of the DC/DC voltage converter according to the above-mentioned first embodiment, except for the configuration and operation of the converter main circuit 2. Descriptions of the same configuration, operation, and function as those in the first embodiment are hereinafter omitted as appropriate.

Referring to FIG. 23, the DC/DC voltage converter according to this embodiment uses unipolar elements made of SiC, which are still larger in bandgap than an element made of Si, for all the rectifier elements and the switch elements of the power semiconductor units PU1 to PU4 of the converter main circuit 2.

Specifically, Schottky barrier diodes (SBDs) made of SiC are used as rectifier elements (diodes) Di1a, Di2a, Di3a, and Di4a. Instead of the IGBT1, the IGBT2, the IGBT3, and the IGBT4, MOS-FETs made of SiC are used as switch elements FET1, FET2, FET3, and FET4.

By configuring the converter main circuit 2 as described in this embodiment, the degree of discontinuity of the power loss in the power semiconductor unit depending on the magnitude of the load amount of the DC/DC voltage converter 1 can be suppressed to reduce the transient voltage fluctuations, and the losses both in the switch element and in the rectifier element can be reduced to improve the operation efficiency of the DC/DC voltage converter, enhance the output power capacity to be handled, and increase the power density.

Each of the switch element and the rectifier element is a unipolar element, and hence the current gradient di/dt in the turn-ON operation and the turn-OFF operation can be set to be higher than that in a bipolar element made of Si. Thus, the switch element and the rectifier element can be operated at a high frequency. Consequently, the passive components used in the DC/DC voltage converter, such as the capacitor and the inductor, can be downsized, and hence the DC/DC voltage converter itself can be reduced in size and weight and the power density thereof can be improved.

According to the DC/DC voltage converter of the present invention, when the conduction current of the inductor is only one of positive and negative in the operation of the converter main circuit, the drive circuit for switching ON the switch element is switched so as to increase the rate of charging electric charge of the gate capacitance of the switch element.

This configuration can suppress an increase in switching loss caused by the turn-ON operation of the switch element, which occurs when the load amount of the DC/DC voltage converter is so large that the conduction current of the inductor remains in one of the positive and negative polarities, and can thereby suppress transient voltage fluctuations (deterioration in DC/DC voltage conversion performance), which occur when the power loss of the power semiconductor unit of the DC/DC voltage converter becomes discontinuous due to the difference in how the polarity of the conduction current of the inductor changes (whether the polarity switches between positive and negative across zero or remains positive or negative) depending on the magnitude of the load amount of the DC/DC voltage converter.

In the plurality of (at least two) pairs of power semiconductor units connected in series in the power module, the rectifier elements included in at least a half of the power semiconductor units on the higher potential node side of the secondary-side terminals of the converter main circuit are rectifier diodes made of a unipolar semiconductor having a larger bandgap than that of a rectifier element made of Si.

In the step-up powering operation for supplying electric power from the primary side to the secondary side of the voltage converter by switching the switch elements on the lower potential node side of the secondary-side terminals of the converter main circuit, the switching loss caused by the turn-ON operation of the switch element can be reduced to further alleviate the degree of discontinuity of the power loss of the power semiconductor unit depending on the magnitude of the load amount of the DC/DC voltage converter, and hence the transient voltage fluctuations (deterioration in DC/DC voltage conversion performance), which occur due to the difference in how the polarity of the conduction current of the inductor changes, can be reduced more.

Further, the losses both in the switch element and in the rectifier diode can be reduced, to thereby improve the operation efficiency of the DC/DC voltage converter, enhance the output power capacity to be handled, and increase the power density.

According to the DC/DC voltage converter of the present invention, the switch element and the rectifier element of the power semiconductor unit are made of a semiconductor material having a larger bandgap than that of Si, and hence the practical upper limit of semiconductor junction temperature is increased as compared to that of the conventional switch element and rectifier element made of Si. Consequently, the output power capacity to be handled by the DC/DC voltage converter can be enhanced to improve the power density.

This effect can be obtained because, even when the output power is increased and a larger loss occurs in the power device to increase the semiconductor junction temperature, the characteristics of the switch element and the rectifier element are less deteriorated and the heat-resistant performance is improved to avoid any malfunction.

While the embodiments of the present invention have been described above by way of the first to fifth embodiments, those embodiments are merely exemplary embodiments of the present invention.

The present invention is not intended to be limited to the configurations and operations described in those embodiments, and some variations may be added for another configuration and operation within the scope of the present invention.

It should also be understood that the present invention encompasses all possible combinations of the above-mentioned embodiments.

What is claimed is:

1. A DC/DC voltage converter, comprising:
a converter main circuit; and
a control unit configured to control voltage conversion of the converter main circuit,
the converter main circuit comprising:
a first smoothing capacitor and a second smoothing capacitor for voltage smoothing, the first smoothing capacitor being connected between a positive terminal and a negative terminal on a primary side of the converter main circuit, the second smoothing capacitor being connected between a positive terminal and a negative terminal on a secondary side of the converter main circuit;
a power module comprising at least two pairs of two power semiconductor units, each of which comprises a switch element and a rectifier element that are connected in anti-parallel,
one of the two power semiconductor units in one of the at least two pairs and one of the two power semiconductor units in another one of the at least two pairs being connected in series between the positive terminal on the primary side and the positive terminal on the secondary side, another of the two power semiconductor units in the one of the at least two pairs and another of the two power semiconductor units in the another one of the at least two pairs being connected in series between the positive terminal on the primary side and the negative terminal on the secondary side in a direction reverse to a direction of the ones of the two power semiconductor units;

an energy transfer capacitor connected between a secondary-side terminal of one of the two power semiconductor units and a secondary-side terminal of another of the two power semiconductor units in the one of the at least two pairs excluding a pair of power semiconductor units closest to the secondary side; and an inductor connected between a pair of the power semiconductor units closest to the primary side and the positive terminal on the primary side, the control unit comprising means for performing control by switching a plurality of switch-ON circuits having different resistance values so as to increase a rate of charging electric charge of a gate capacitance of the switch element of each of the at least two pairs of two power semiconductor units when a conduction current of the inductor remains in any one of a positive polarity and a negative polarity in an operation of the converter main circuit.

2. The DC/DC voltage converter according to claim 1, wherein the control unit further comprises means for increasing a switching frequency of the switch element when the conduction current of the inductor switches alternately between the positive polarity and the negative polarity across zero in the operation of the converter main circuit.

3. The DC/DC voltage converter according to claim 2, wherein at least one of the switch element and the rectifier element provided in the each of the at least two pairs of two power semiconductor units comprises an element made of a semiconductor having a bandgap larger than a bandgap of an element made of Si.

4. The DC/DC voltage converter according to claim 1, wherein the rectifier element provided in one of the two power semiconductor units in each of the at least two pairs in the power module comprises a unipolar semiconductor diode having a bandgap larger than a bandgap of a rectifier element made of Si.

5. The DC/DC voltage converter according to claim 2, wherein the rectifier element provided in one of the two power semiconductor units in each of the at least two pairs in the power module comprises a unipolar semiconductor diode having a bandgap larger than a bandgap of a rectifier element made of Si.

6. The DC/DC voltage converter according to claim 5, wherein at least one of the switch element and the rectifier element provided in the each of the at least two pairs of two power semiconductor units comprises an element made of a semiconductor having a bandgap larger than a bandgap of an element made of Si.

7. The DC/DC voltage converter according to claim 5, wherein the control unit is configured to operate so that the rate of charging electric charge of the gate capacitance of the switch element of the one of the two power semiconductor units in each of the at least two pairs included in the power module becomes higher than the rate of charging electric charge of the gate capacitance of the switch element of the another of the two power semiconductor units.

8. The DC/DC voltage converter according to claim 4, wherein the control unit is configured to operate so that the rate of charging electric charge of the gate capacitance of the switch element of the one of the two power semiconductor units in each of the at least two pairs included in the power module becomes higher than the rate of charging electric charge of the gate capacitance of the switch element of the another of the two power semiconductor units.

9. The DC/DC voltage converter according to claim 4, wherein at least one of the switch element and the rectifier element provided in the each of the at least two pairs of two power semiconductor units comprises an element made of a semiconductor having a bandgap larger than a bandgap of an element made of Si.

10. The DC/DC voltage converter according to claim 1, wherein at least one of the switch element and the rectifier element provided in the each of the at least two pairs of two power semiconductor units comprises an element made of a semiconductor having a bandgap larger than a bandgap of an element made of Si.

11. A voltage conversion control method for a DC/DC voltage converter, the DC/DC voltage converter being configured to control voltage conversion of a converter main circuit with use of a control unit, the converter main circuit comprising:

a first smoothing capacitor and a second smoothing capacitor for voltage smoothing, the first smoothing capacitor being connected between a positive terminal and a negative terminal on a primary side of the converter main circuit, the second smoothing capacitor being connected between a positive terminal and a negative terminal on a secondary side of the converter main circuit;

a power module comprising at least two pairs of two power semiconductor units, each of which comprises a switch element and a rectifier element that are connected in anti-parallel, one of the two power semiconductor units in one of the at least two pairs and one of the two power semiconductor units in another one of the at least two pairs being connected in series between the positive terminal on the primary side and the positive terminal on the secondary side, another of the two power semiconductor units in the one of the at least two pairs and another of the two power semiconductor units in the another one of the at least two pairs being connected in series between the positive terminal on the primary side and the negative terminal on the secondary side in a direction reverse to a direction of the ones of the two power semiconductor units;

an energy transfer capacitor connected between a secondary-side terminal of one of the two power semiconductor units and a secondary-side terminal of another of the two power semiconductor units in the one of the at least two pairs excluding a pair of power semiconductor units closest to the secondary side; and an inductor connected between a pair of the power semiconductor units closest to the primary side and the positive terminal on the primary side, the voltage conversion control method comprising performing control by switching a plurality of switch-ON circuits having different resistance values so as to increase a rate of charging electric charge of a gate capacitance of the switch element of each of the at least two pairs of two power semiconductor units when a conduction current of the inductor remains in any one of a positive polarity and a negative polarity in an operation of the converter main circuit.

* * * * *